(12) United States Patent
Cheah et al.

(10) Patent No.: US 11,837,842 B2
(45) Date of Patent: Dec. 5, 2023

(54) TUNABLE LASER MATERIALS COMPRISING SOLID-STATE BLENDED POLYMERS

(71) Applicant: Hong Kong Baptist University, Hong Kong (HK)

(72) Inventors: Kok Wai Cheah, Hong Kong (HK); Yi Jiang, Hong Kong (HK)

(73) Assignee: Hong Kong Baptist University, Hong Kong (HK)

( * ) Notice: Subject to any disclaimer, the term of this patent is extended or adjusted under 35 U.S.C. 154(b) by 409 days.

(21) Appl. No.: 17/114,463

(22) Filed: Dec. 7, 2020

(65) Prior Publication Data
US 2021/0203122 A1 Jul. 1, 2021

Related U.S. Application Data

(60) Provisional application No. 62/954,655, filed on Dec. 29, 2019.

(51) Int. Cl.
*H01S 3/16* (2006.01)
*H01S 3/13* (2006.01)
(Continued)

(52) U.S. Cl.
CPC ............... *H01S 3/16* (2013.01); *C08L 25/02* (2013.01); *H01S 3/0602* (2013.01);
(Continued)

(58) Field of Classification Search
CPC ............ H01S 3/0635; H01S 5/36; H10K 50/125–131; H10K 50/852; H10K 50/854
See application file for complete search history.

(56) References Cited

U.S. PATENT DOCUMENTS 5,881,083 A * 3/1999 Diaz-Garcia ............. H01S 5/30
372/54
5,966,393 A * 10/1999 Hide ..................... H01L 33/502
372/39
(Continued)

FOREIGN PATENT DOCUMENTS

CN 101388523 A * 3/2009
CN 106451063 A 2/2017
(Continued)

OTHER PUBLICATIONS

Ibnaeouf, "Laser from External Energy Transfer of MEH-PPV Conjugated Polymer", 2012, Optics & Laser Technology, 44, 710-713. (Year: 2012).*
(Continued)

*Primary Examiner* — Joshua King
(74) *Attorney, Agent, or Firm* — Idea Intellectual Limited; Margaret A. Burke; Sam T. Yip

(57) ABSTRACT

The present invention relates to a solid-state blended polymer system that has the property of tunable lasing wavelength through adjusting the blending ratio. It can be used for health monitoring, environmental monitoring sensor and tissue imaging. Current materials do not have the broad tunable range; from blue to infra-red across the optical range. By using the same two polymers, it is possible to produce laser emitting blue to red colour. It simplifies the design, eases multi-wavelength laser sensor system integration and therefore, making the production cost-effective.

15 Claims, 38 Drawing Sheets

PFO

BEHP-PPV

MEH-PPV

(51) Int. Cl.
  *H01S 3/06* (2006.01)
  *H01S 3/063* (2006.01)
  *C08L 25/02* (2006.01)

(52) U.S. Cl.
  CPC .......... *H01S 3/0619* (2013.01); *H01S 3/1305* (2013.01); *H01S 3/168* (2013.01); *C08L 2205/025* (2013.01); *H01S 3/0635* (2013.01)

(56) References Cited

U.S. PATENT DOCUMENTS

| | | | | |
|---|---|---|---|---|
| 6,410,416 | B1* | 6/2002 | Dodabalapur | H01S 5/1231 438/749 |
| 6,577,657 | B1* | 6/2003 | Elschner | H01S 5/0207 372/39 |
| 2002/0009274 | A1* | 1/2002 | Gharavi | H01S 5/36 385/40 |
| 2004/0201000 | A1* | 10/2004 | Norwood | C08L 85/02 252/582 |
| 2005/0111513 | A1* | 5/2005 | Ubukata | H01S 3/0635 372/39 |
| 2007/0274357 | A1* | 11/2007 | Bazan | C08G 61/02 427/407.1 |
| 2008/0043786 | A1* | 2/2008 | Wilhelm | G02B 21/0032 372/20 |
| 2010/0084627 | A1* | 4/2010 | Berger | H10N 80/00 257/7 |
| 2012/0313268 | A1* | 12/2012 | Bianchi | G01J 1/50 252/301.33 |
| 2017/0149210 | A1* | 5/2017 | Zhai | H01S 5/0211 |
| 2017/0163011 | A1* | 6/2017 | Chan | G01H 9/004 |

FOREIGN PATENT DOCUMENTS

| | | | | |
|---|---|---|---|---|
| CN | 107681463 | A * | 2/2018 | H01S 5/041 |
| CN | 107681463 | A | 2/2018 | |
| CN | 108808447 | A * | 11/2018 | H01S 5/36 |
| CN | 108808447 | A | 11/2018 | |
| CN | 110137799 | A | 8/2019 | |
| DE | 102014207723 | A1 * | 10/2015 | H01S 5/187 |
| EP | 0549037 | A1 * | 6/1993 | |
| WO | WO-0070719 | A1 * | 11/2000 | G02B 6/02033 |
| WO | WO-2016037057 | A1 * | 3/2016 | B01F 3/0815 |
| WO | WO-2018043763 | A1 * | 3/2018 | H01S 3/1305 |
| WO | WO-2018147470 | A1 * | 8/2018 | H01S 5/026 |

OTHER PUBLICATIONS

J. C. Sanchez, A. Escobosa and M. Estrada, "Characterization of Thin Films of Conjugated Polymer (BEHP-PPV)-co-(MEH-PPV) for OLEDs Aplication," 2006 3rd International Conference on Electrical and Electronics Engineering, Veracruz, Mexico, 2006, pp. 1-4. (Year: 2006).*

Mujamammi, W.M.; Prasad, S.; AlSalhi, M.S.; Masilamani, V. "Relaxation Oscillation with Picosecond Spikes in a Conjugated Polymer Laser", Polymers 2016, 8, 364. (Year: 2016).*

Lee et al., "Properties of Polymer Light Emitting Diodes Using PFO:MEH-PPV Emission Layer and Hole Blocking Layer", Jun. 2008, Journal of the Semiconductor & Display Equipment Technology, vol. 7, No. 2, 49-53. (Year: 2008).*

Ibnaeouf et al., "Triple Amplified Spontaneous Emissions from a Conjugated Copolymer BEHP-co-MEH-PPV in Solution", 2013, Physica E, 53, 66-71. (Year: 2013).*

Marco Anni, "Poly [2-methoxy-5-(2-ethylhexyloxy)-1, 4-phenylenevinylene] (MeH-PPV) Amplified Spontaneous Emission Optimization in Poly (9, 9-dioctylfluorene (PFO): MeH-PPV Active Blends", Journal of Luminescence, 215, 116680, 2019, pp. 1-7.

M. U. Hassaan et al., "Highly efficient energy transfer in light emissive poly (9, 9-dioctylfluorene) and poly (p-phenylenevinylene) Blend System", ACS Photonics, 2017, pp. 607-613.

Zhenyu Tang et al., "Lasing and Transport Properties of Poly [(9, 9-dioctyl-2, 7-divinylenefluorenylene)-alt-co-(2-methoxy-5-(2-ethylhexyloxy)-1, 4-phenylene)](POFP) for the Application of Diode-Pumped Organic Solid Lasers", Nanoscale research letters, 12(1), 2017, pp. 1-7.

Myoung Hoon Song et al., "Tuning the wavelength of lasing emission in organic semiconducting laser by the orientation of liquid crystalline conjugated polymer", Journal of Applied Physics, 104(3), 033107, 2008.

Alexander J.C. Kuehne et al., "Organic lasers: recent developments on materials, device geometries, and fabrication techniques", Chemical Reviews, 2016, 21(116), pp. 12823-12864.

International Search Report of corresponding PCT Patent Application No. PCT/CN2020/134637 dated Mar. 18, 2021.

Zhai T. et al., "Red-Green-Blue Laser Emission from Cascaded Polymer Membranes", The Royal Society of Chemistry, Nanoscale, Jul. 2015, pp. 19935-19939.

Zhou H. et al., "Vapor Growth and Tunable Lasing of Band Gap Engineered Cesium Lead Halide Perovskite Micro/Nanorods with Triangular Cross Section", ACS Nano, 2017, 11(2), pp. 1189-1195.

* cited by examiner h i d e j k

TUNABLE LASER MATERIALS COMPRISING SOLID-STATE BLENDED POLYMERS

CROSS-REFERENCE TO RELATED APPLICATIONS

The present application claims priority from the U.S. provisional patent application Ser. No. 62/954,655 filed Dec. 29, 2019, and the disclosure of which is incorporated herein by reference in its entirety.

FIELD OF THE INVENTION

The present invention relates to a solid-state blended polymer system that has the property of tuning the laser emission to different lasing wavelength through adjusting the blending ratio.

BACKGROUND OF THE INVENTION

A laser system consists of pumping/excitation source, lasing material, and feedback structure, which is commonly, called gain medium and optical cavity. Below is a brief description of these parts:
1. Pumping/excitation source: This is the energy source that supplies the excitation energy to the gain medium. Typically, the pumping source can be either electrical current injection or optical source, e.g., a laser, flash lamp.
2. Gain medium: This is the lasing material. It can be inorganic or organic material. It will absorb most of the excitation energy and emit laser.
3. Optical cavity: The gain medium is placed inside the optical cavity, which confines the stimulated emission allowing it to build up to the required intensity to become laser.

Lasing Process

The lasing material when excited will first emit photoluminescence (PL), optically excited luminescence, a process called spontaneous emission. Then with greater excitation, the emission will shift into another process and is called Amplified Spontaneous Emission (ASE). With further excitation, the emission become stimulated emission which is commonly called lasing. The optical characteristic difference between ASE and lasing are not significant in optoelectronics/photonic applications, therefore they are often being grouped together as lasing.

Emission Characteristics

Emission characteristic is defined by its emission spectrum width, measured at half of its maximum intensity—Full Width Half Maximum (FWHM). PL has broad emission FWHM, typically is 20-50 nm. ASE has FWHM of 5-10 nm and laser FWHM is generally less than 5 nm.

Most inorganic or organic solid state lasers lase with single wavelength only. However, to produce tunable laser emission across a broad wavelength range, for example, optical range from a single organic system has yet to be realized. Current approach on tunable laser system is using feedback structure design, Burstein-Moss effect, and bandgap engineering.

SUMMARY OF THE INVENTION

Accordingly, it is an objective of the present invention to produce a solid-state blended polymer system that has the property of tunable lasing wavelength through adjusting the blending ratio. It can be used for health monitoring, environmental monitoring sensor and tissue imaging. Current materials do not have the broad tunable range; from blue to infra-red across the optical range. By using the same two polymers, it is possible to produce laser emitting blue to red colour. It simplifies the design, eases multi-wavelength laser sensor system integration and therefore, making the production cost-effective.

In a first aspect of the present invention, there is provided a solid-state blended polymer lasing system with a lasing wavelength that is tunable by adjusting a blending ratio of polymer compounds in said polymer lasing system comprising a blend of at least two polymer compounds comprising poly(9,9-dioctylfluorene) (PFO), poly(2-(2',5'-bis(2"-ethylhexyloxy)phenyl)-1,4-phenylenevinylene) (BEHP-PPV) and poly(2-methoxy-5-(2-ethylhexyloxy)-1,4-phenylenevinylene) (MEH-PPV).

In a first embodiment of the first aspect of the present invention, there is provided a solid-state blended polymer lasing system wherein the blend of at least two polymer compounds is either a blend of poly(9,9-dioctylfluorene) and poly(2-(2',5'-bis(2"-ethylhexyloxy)phenyl)-1,4-phenylenevinylene), or a blend of poly(2-(2',5'-bis(2"-ethylhexyloxy)phenyl)-1,4-phenylenevinylene) and poly(2-methoxy-5-(2-ethylhexyloxy)-1,4-phenylenevinylene).

In a second embodiment of the first aspect of the present invention, there is provided a solid-state blended polymer lasing system wherein the blending ratio of the at least two polymer compounds of said blended polymer lasing system is equal to or higher than 0.01:99.99, and wherein the majority of the blend of the at least two polymer compounds is poly(2-(2',5'-bis(2"-ethylhexyloxy)phenyl)-1,4-phenylenevinylene).

In a third embodiment of the first aspect of the present invention, there is provided a solid-state blended polymer lasing system wherein the blending ratio of the at least two polymer compounds of said blended polymer lasing system is equal to or lower than 40:60, and wherein the majority of the blend of the at least two polymer compounds is Poly(2-(2',5'-bis(2"-ethylhexyloxy)phenyl)-1,4-phenylenevinylene.

In a fourth embodiment of the first aspect of the present invention, there is provided a solid-state blended polymer lasing system wherein the blending ratio of the at least two polymer compounds of said blended polymer lasing system is equal to or higher than 0.1:99.9, and wherein the majority of the blend of the at least two polymer compounds is poly(9,9-dioctylfluorene).

In a fifth embodiment of the first aspect of the present invention, there is provided a solid-state blended polymer lasing system wherein the blending ratio of the at least two polymer compounds of said blended polymer lasing system is equal to or lower than 40:60, and wherein the majority of the blend of the at least two polymer compounds is poly(9,9-dioctylfluorene).

In a sixth embodiment of the first aspect of the present invention, there is provided a solid-state blended polymer lasing system wherein the blending ratio of the at least two polymer compounds of said blended polymer lasing system is equal to or higher than 0.01:99.99, and wherein the minority of the blend of the at least two polymer compounds is poly(2-methoxy-5-(2-ethylhexyloxy)-1,4-phenylenevinylene).

In a seventh embodiment of the first aspect of the present invention, there is provided a solid-state blended polymer lasing system wherein the blending ratio of the at least two polymer compounds of said blended polymer lasing system is equal to or lower than 40:60, and wherein the minority of the blend of the at least two polymer compounds is poly(2-methoxy-5-(2-ethylhexyloxy)-1,4-phenylenevinylene).

In an eighth embodiment of the first aspect of the present invention, there is provided a solid-state blended polymer lasing system wherein the blending ratio of the at least two polymer compounds of said blended polymer lasing system is equal to or higher than 0.1:99.9, and wherein the minority of the blend of the at least two polymer compounds is poly(2-(2',5'-bis(2"-ethylhexyloxy)phenyl)-1,4-phenylenevinylene).

In a ninth embodiment of the first aspect of the present invention, there is provided a solid-state blended polymer lasing system wherein the blending ratio of the at least two polymer compounds of said blended polymer lasing system is equal to or lower than 40:60, and wherein the minority of the blend of the at least two polymer compounds is poly(2-(2',5'-bis(2"-ethylhexyloxy)phenyl)-1,4-phenylenevinylene).

In a tenth embodiment of the first aspect of the present invention, there is provided a solid-state blended polymer lasing system wherein further comprises a DFB feedback structure with different grating periods being integrated therein to provide different tunable lasing outputs.

In an eleventh embodiment of the first aspect of the present invention, there is provided a solid-state blended polymer lasing system wherein one of the grating periods is 270 nm; one of the at least two polymer compounds is poly(9,9-dioctylfluorene); and the corresponding tunable lasing output has a wavelength variation between 439 nm to 456 nm.

In a twelfth embodiment of the first aspect of the present invention, there is provided a solid-state blended polymer lasing system wherein one of the grating periods is 340 nm; two of the at least two polymer compounds are poly(9,9-dioctylfluorene) and poly(2-(2',5'-bis(2"-ethylhexyloxy)phenyl)-1,4-phenylenevinylene); and the corresponding tunable lasing output has a wavelength variation between 500 nm to 541 nm.

In a thirteenth embodiment of the first aspect of the present invention, there is provided a solid-state blended polymer lasing system wherein one of the grating periods is 415 nm; two of the at least two polymer compounds are poly(2-(2',5'-bis(2"-ethylhexyloxy)phenyl)-1,4-phenylenevinylene) and poly(2-methoxy-5-(2-ethylhexyloxy)-1,4-phenylenevinylene); and the corresponding tunable lasing output has a wavelength variation between 600 nm to 644 nm.

In a fourteenth embodiment of the first aspect of the present invention, there is provided a solid-state blended polymer lasing system wherein the blended polymer lasing system forms one or more blended polymer films with a film thickness ranging from 120 nm to 195 nm.

In a fifteenth embodiment of the first aspect of the present invention, there is provided a solid-state blended polymer lasing system wherein the one or more films of blended polymer is/are deposited by spin-coating a solution mixture of the at least two polymer compounds on quartz substrates.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the present invention will be apparent to those skilled in the art from a review of the ensuing description.

BRIEF DESCRIPTION OF THE DRAWINGS

The present invention will become apparent from the following description, when taken in conjunction with the accompanying drawings, in which.

DETAILED DESCRIPTION OF THE INVENTION

The present invention is not to be limited in scope by any of the specific embodiments described herein. The following embodiments are presented for exemplification only.

Organic Gain Media

Figure 1:
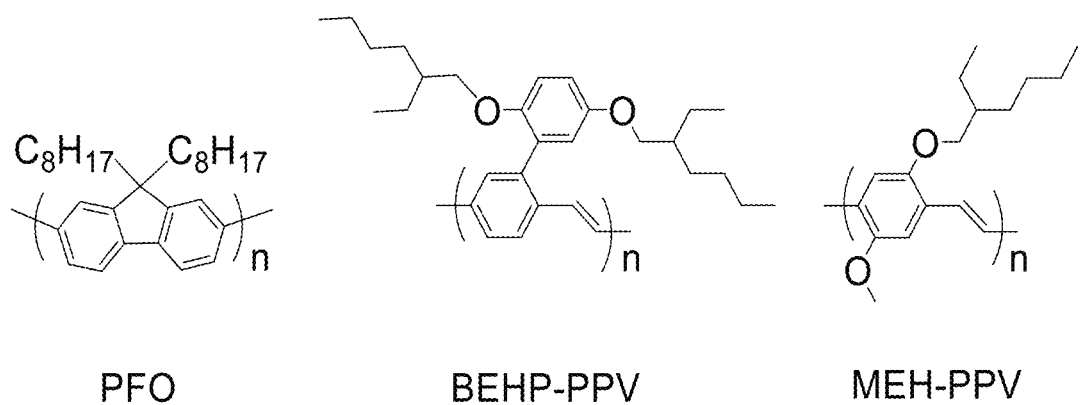
FIG. 1 shows chemical structures of poly(9,9-dioctylfluorene) (PFO), poly(2-(2',5'-bis(2"-ethylhexyloxy)phenyl)-1,4-phenylenevinylene) (BEHP-PPV) and poly(2-methoxy-5-(2-ethylhexyloxy)-1,4-phenylenevinylene) (MEH-PPV).

Poly(9,9-dioctylfluorene) (PFO) is selected as one of the blended polymers for blue emission. Poly(2-(2',5'-bis(2"-ethylhexyloxy)phenyl)-1,4-phenylenevinylene) (BEHP-PPV) and poly(2-methoxy-5-(2-ethylhexyloxy)-1,4-phenylenevinylene) (MEH-PPV) are selected as the two polymers for green to red emission (FIG. 1). It is possible for some materials/compounds to exhibit lasing or ASE when they are in solution form; in solution they are well separated physically, and therefore behaves as individual. However, when in solid form, the materials which can be a compound (e.g. a molecule) or atom, are then closely packed. Under these conditions, they will influence each other; one consequence of the closeness is that it quenches any luminescence, including lasing and ASE. Therefore, materials that exhibit ASE/lasing property in solution do not necessarily mean they will do so when they are in solid state form. This phenomenon is well recognized in scientific community.

Methods & Results

ASE Measurements

For ASE measurements without further note, Nd-YAG Q-switched laser (3 ns, 355 nm, 7500 Hz) is used to providing the pumping energy. A chopper is added to obtain a chopping frequency of at 18 Hz. The laser beam was transformed by a cylindrical lens to form a 5.0 mm×0.40 mm stripe shaped excitation area. The edge ASE emission was monitored by Ocean optics USB4000.

Lasing/ASE threshold, which is a key parameter for laser/amplification device, is defined the state where the gain just equals the resonator and optical waveguide losses. A low lasing/ASE threshold is always the pursuit for the engineering of laser device, which means the low energy needed for laser/amplification. For ASE, the threshold is related to the waveguide quality, the gain of material, laser pulse width, and so on. In the similar pumping condition, the thresholds of different materials could be compared with each other to choice more suitable gain materials for laser device.

Figure 2A:
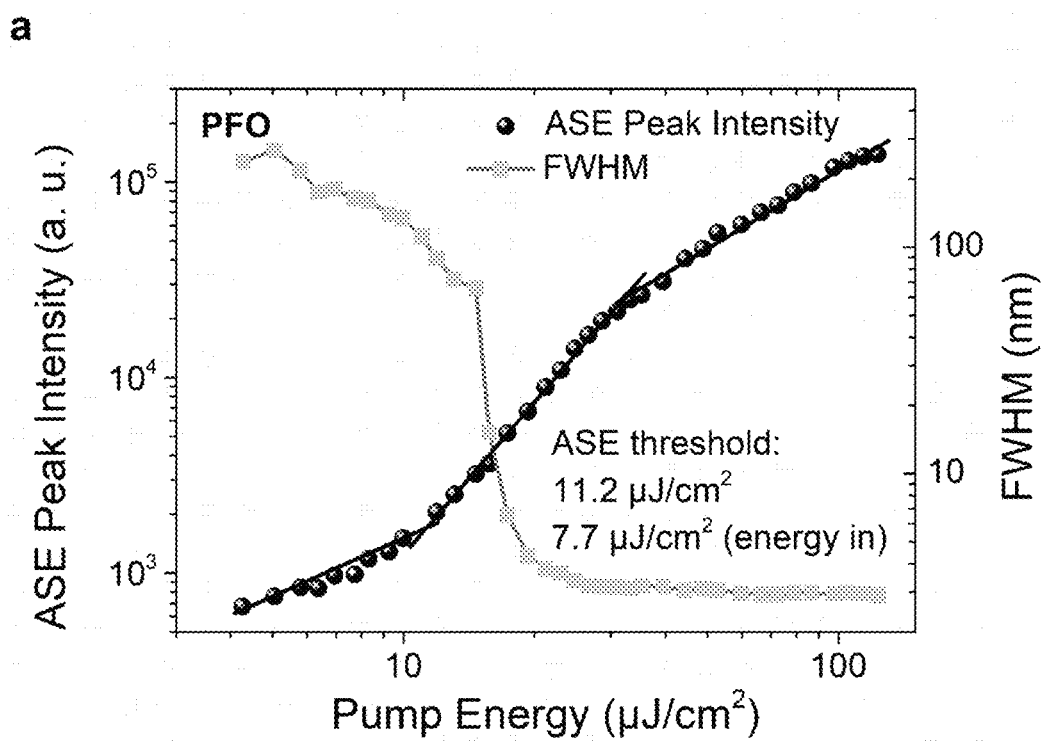
FIG. 2A shows FWHM of the emission spectra (solid squares) and the corresponding output intensity (solid spheres) of PFO sample as a function of the pump energy density. The ASE threshold value and ASE threshold (energy in) value are estimated with or without taking into account of transmission loss, respectively.
Figure 2B:
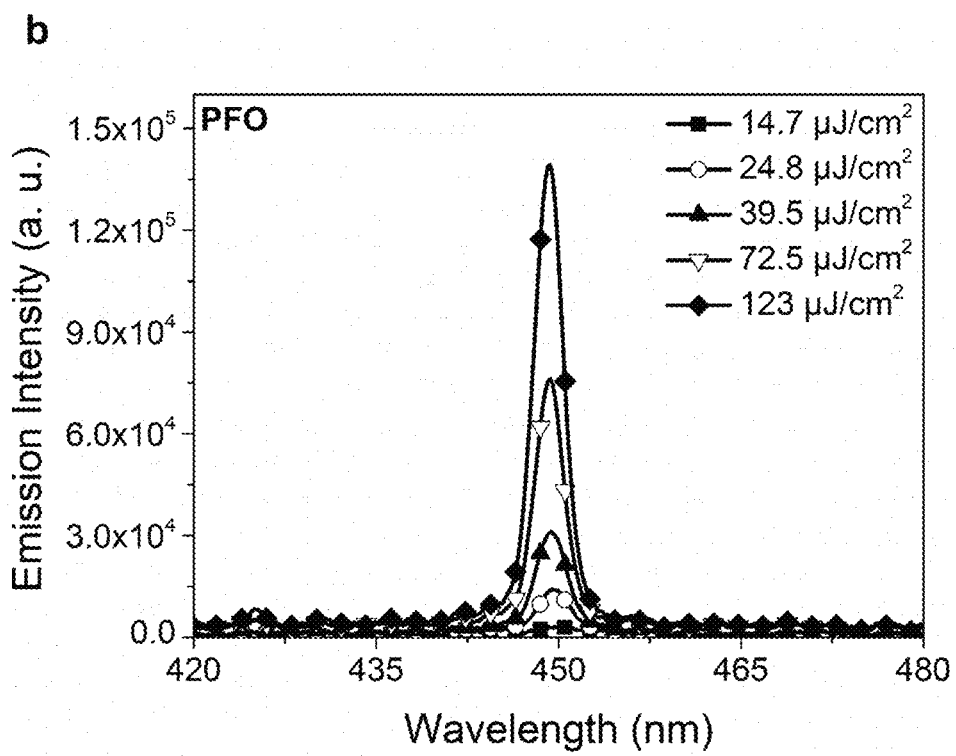
FIG. 2B shows the emission spectra for the planar waveguide of PFO sample with various pump fluences.
Figure 3A:
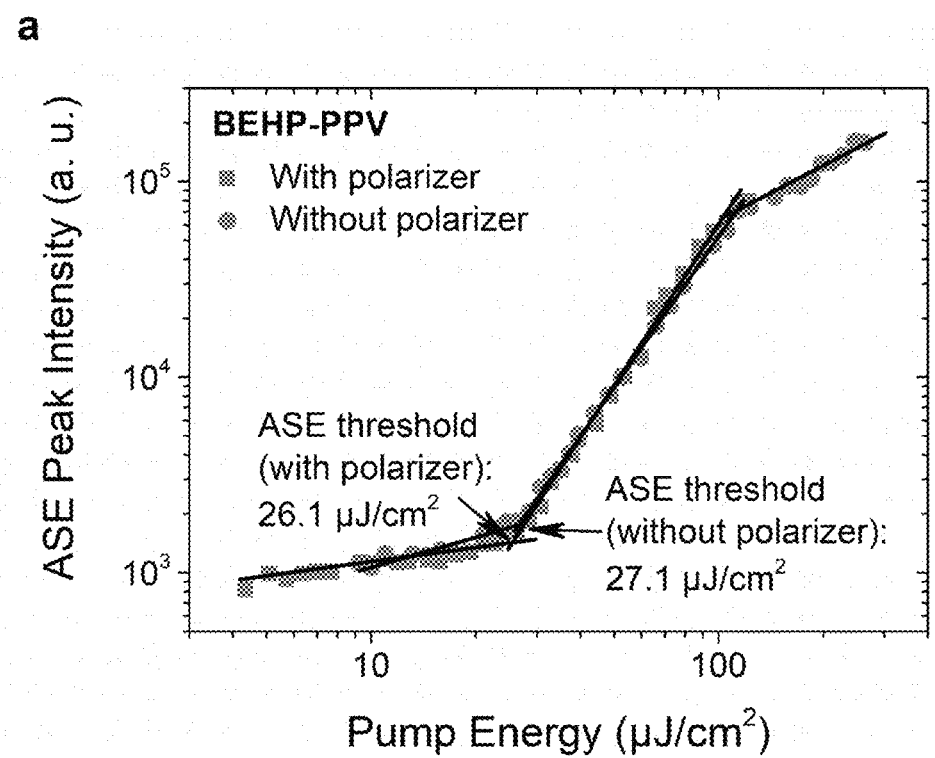
FIG. 3A shows the corresponding output intensity (solid squares and spheres, with polarizer and without polarizer) of BEHP-PPV sample as a function of the pump energy density.
Figure 3B:
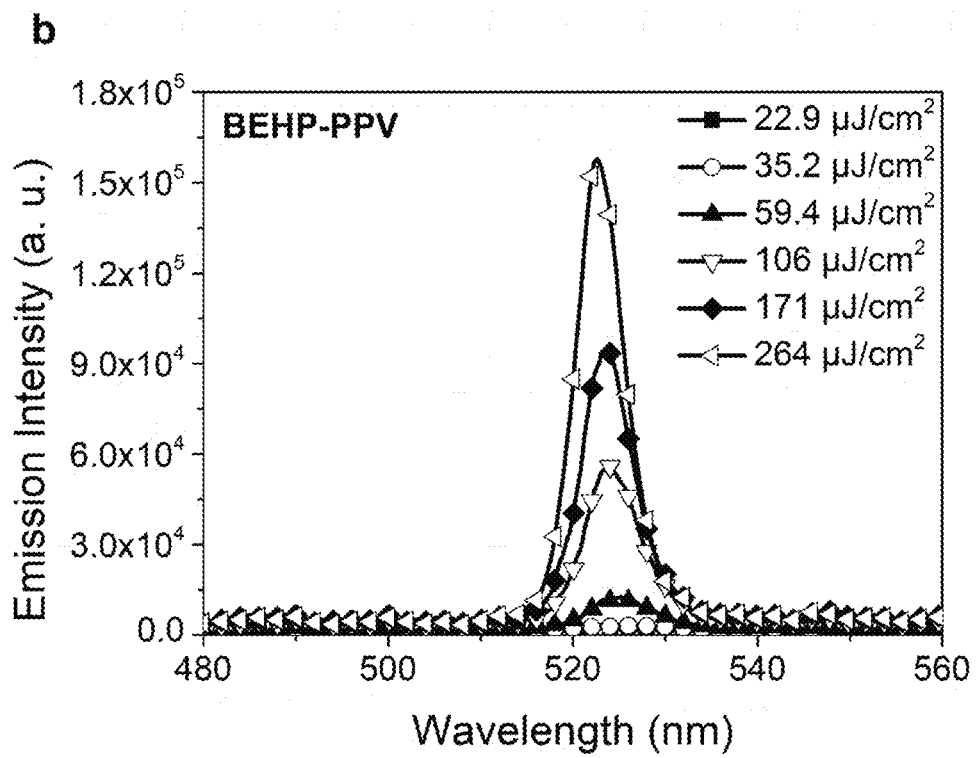
FIG. 3B shows the emission spectra for the planar waveguide of BEHP-PPV sample with various pump fluences (without polarizer).

The threshold of PFO film is ca. 11.2 µJ/cm$^2$ (FIG. 2A). That is credible comparing with other reports (a little lower, mainly due to the small pulse width in the device). The corresponding ASE peak from PFO planar waveguide is @449 nm (FIG. 2B). The threshold of BEHP-PPV film is ca. 26.1 µJ/cm$^2$ (FIG. 3A). For energy in, the threshold is ca. 11.7 µJ/cm$^2$. The corresponding ASE peak from BEHP-PPV planar waveguide is @524 nm (FIG. 3B). Inventors do not get the narrowed spectra of MEH-PPV at 355 nm, mainly due to its very low absorption at 355 nm.

Guest-Host Energy Transfer System for the Tunable Amplification

Figure 4:
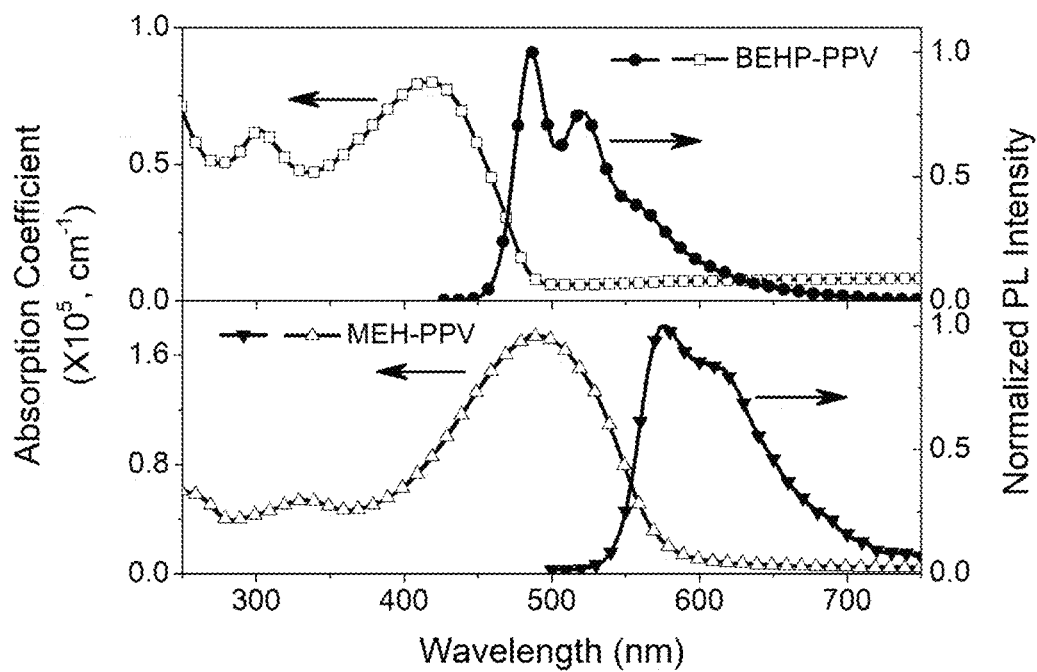
FIG. 4 shows the absorbance and PL spectra of BEHP-PPV and MEH-PPV. There is an obvious spectral overlap between the absorption spectrum of MEH-PPV and the PL spectrum of BEHP-PPV, which is expected to induce efficient energy transfer from BEHP-PPV to MEH-PPV.

The polymers, BEHP-PPV and MEH-PPV, share a common main body, PPV. PL of BEHP-PPV peaks at 487 nm. The quantum efficiency of BEHP-PPV in neat film is 20%@390 nm. The absorption peak is @ 416 nm and dropping sharply to zero @ 491 nm for BEHP-PPV. PL of MEH-PPV peaks at 575 nm. The quantum efficiency of MEH-PPV in neat film is 9%@390 nm. The absorption peak is @ 488 nm and dropping to zero @ 600 nm for MEH-PPV (FIG. 4).

The emission spectrum of BEHP-PPV coincide well with the absorption spectrum of MEH-PPV. Efficient energy transfer from BEHP-PPV to MEH-PPV through FRET is expected (FIG. 4).

BEHP-PPV:MEH-PPV Blend System

The blended solutions are prepared by mixing the polymer solutions (BEHP-PPV and MEH-PPV). The concentration of BEHP-PPV is selected at 22 mg/ml. The concentrations of MEH-PPV are selected at 0.1 mg/ml, 0.5 mg/ml, 2 mg/ml, 8 mg/ml for different blending conditions. The mixed solutions are stirred with heating (50-90° C.) and a stirring speed (200-1000 rpm). The blending information is listed in Table 1.

TABLE 1

Blending information.

| Concentration | BEHP-PPV (22 mg/mL) | MEH-PPV (0.1 mg/mL) | MEH-PPV (0.5 mg/mL) | MEH-PPV (2 mg/mL) | MEH-PPV (8 mg/mL) |
|---|---|---|---|---|---|
| 0% | 300 μL | | | | |
| 0.01% | 400 μL | 8.8 μL | | | |
| 0.02% | 400 μL | 17.7 μL | | | |
| 0.04% | 400 μL | 35.2 μL | | | |
| 0.1% | 400 μL | | 17.7 μL | | |
| 0.2% | 400 μL | | | 8.8 μL | |
| 0.4% | 400 μL | | | 17.7 μL | |
| 0.8% | 400 μL | | | 35.5 μL | |
| 1% | 300 μL | | | | 8.3 μL |
| 2% | 300 μL | | | | 16.84 μL |
| 4% | 300 μL | | | | 34.38 μL |
| 6% | 300 μL | | | | 52.7 μL |
| 8% | 300 μL | | | | 71.7 μL |
| 10% | 300 μL | | | | 91.67 μL |
| 12% | 300 μL | | | | 112.5 μL |
| 16% | 300 μL | | | | 157.1 μL |
| 20% | 300 μL | | | | 206.25 μL |
| 40% | 300 μL | | | | 550 μL |
| 100% | | | | | 300 μL |

Figure 5:
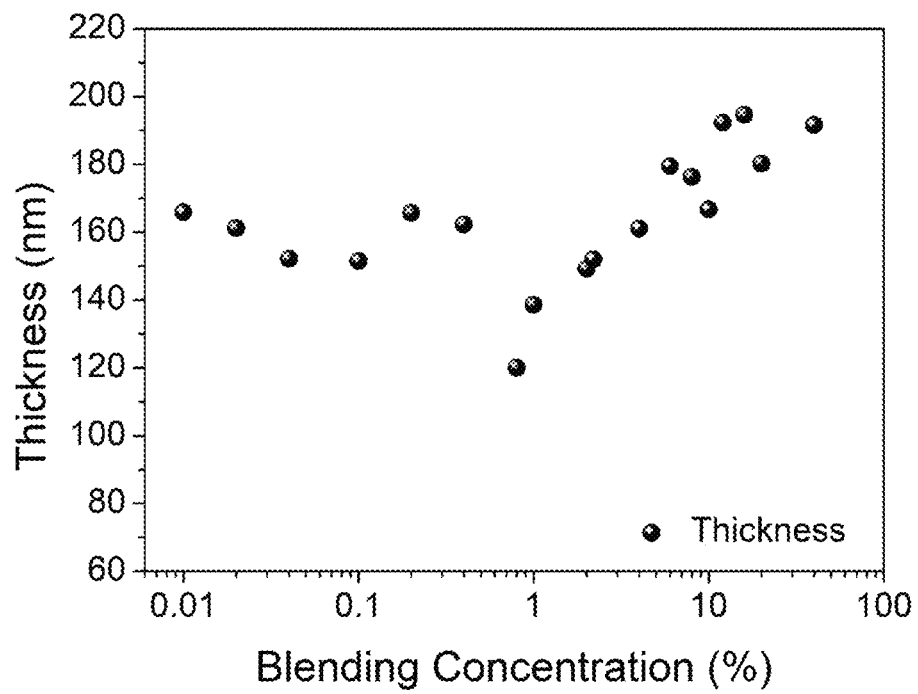
FIG. 5 shows the corresponding film thickness as a function of blending concentration.
Figure 6A:
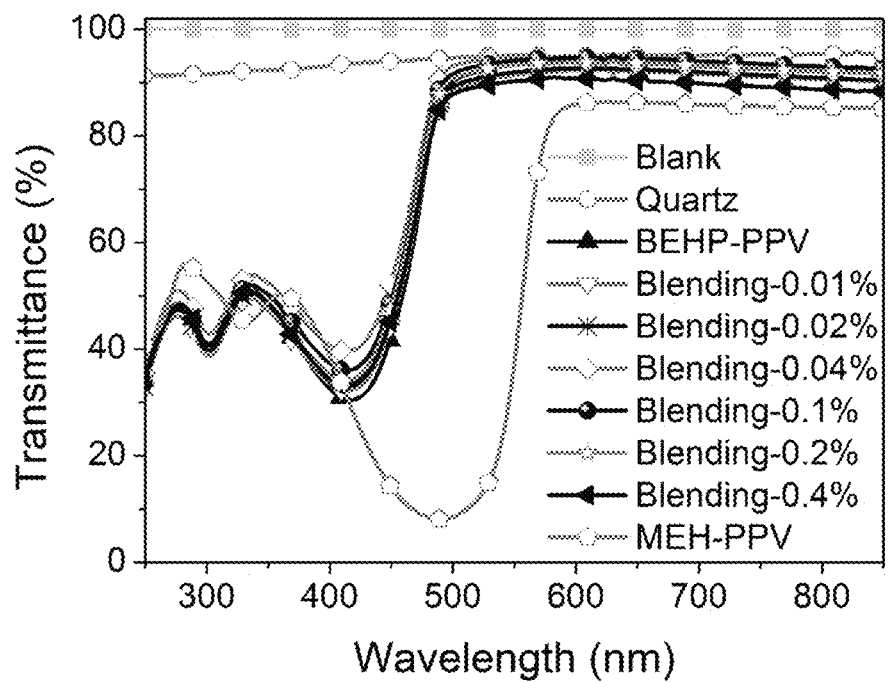
FIG. 6A shows transmittance spectra of BEHP-PPV:MEH-PPV blend system in neat films. The MEH-PPV concentrations are tuned in the range of 0.01%-0.4%. The transmittance spectra of BEHP-PPV and MEH-PPV neat films are also shown in the figure.
Figure 6B:
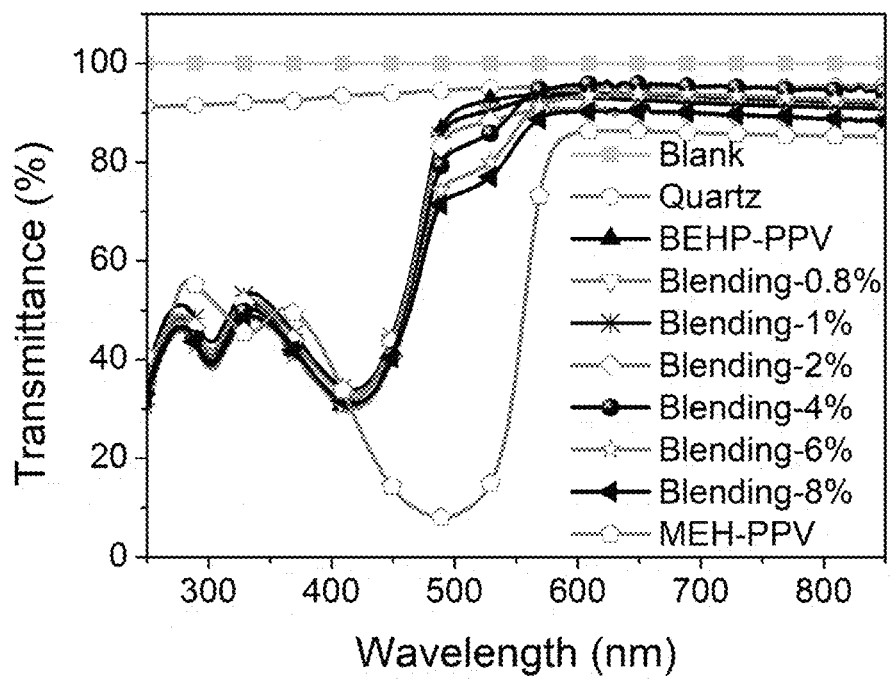
FIG. 6B shows transmittance spectra of BEHP-PPV:MEH-PPV blend system in neat films. The MEH-PPV concentrations are tuned in the range of 0.8%-8%. The transmittance spectra of BEHP-PPV and MEH-PPV neat films are also shown in the figure.
Figure 6C:
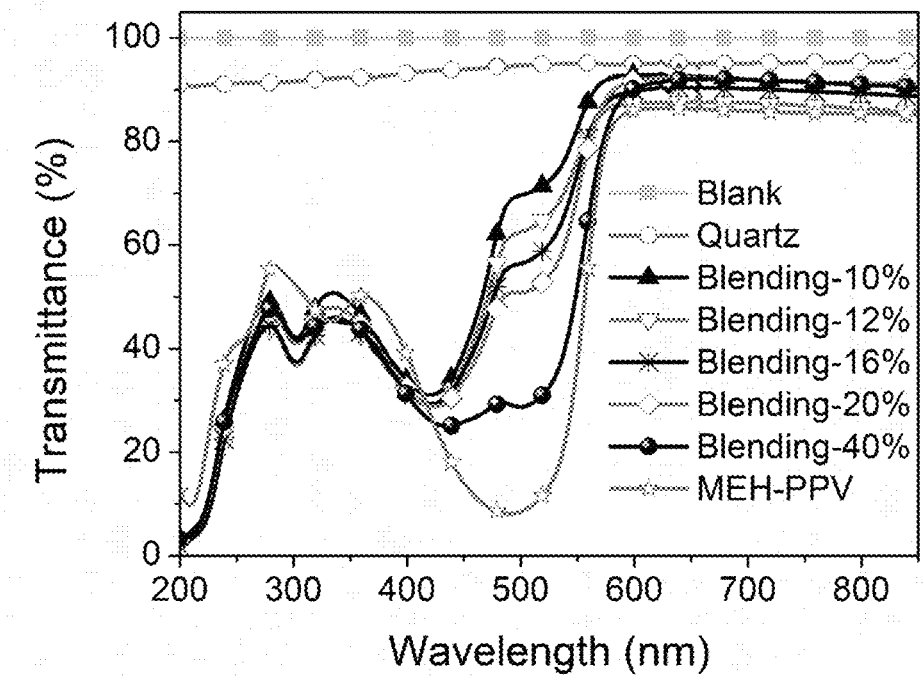
FIG. 6C shows transmittance spectra of BEHP-PPV:MEH-PPV blend system in neat films. The MEH-PPV concentrations are tuned in the range of 10%-40%. The transmittance spectra of BEHP-PPV and MEH-PPV neat films are also shown in the figure.
Figure 6D:
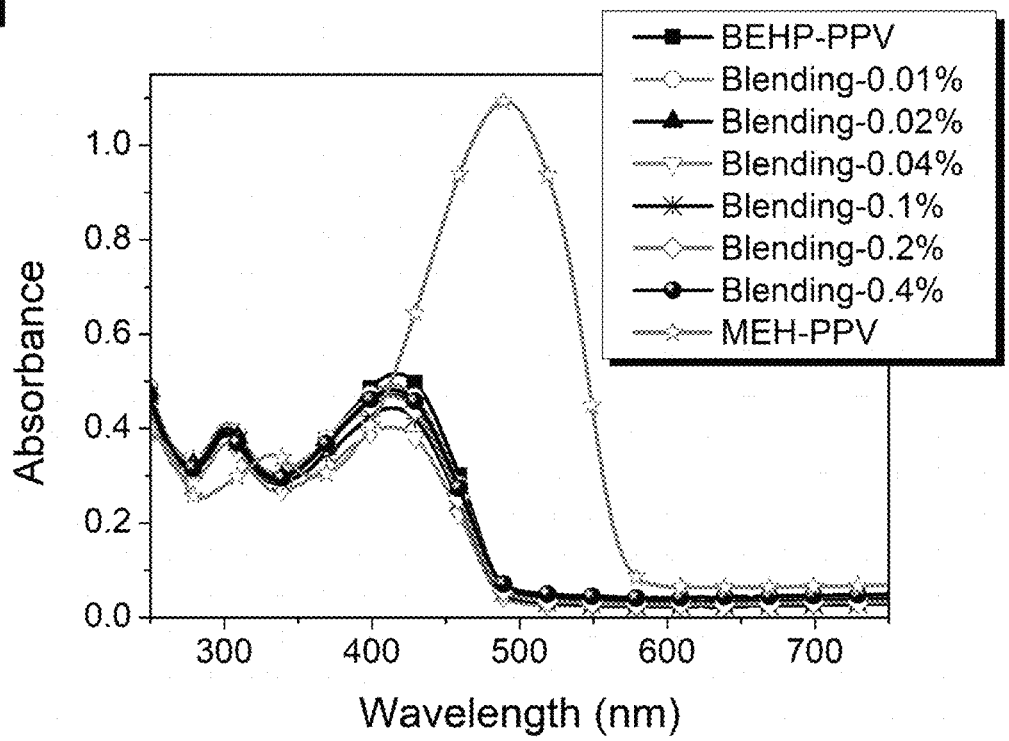
FIG. 6D shows absorbance spectra of BEHP-PPV:MEH-PPV blend system in neat films. The MEH-PPV concentrations are tuned in the range of 0.01%-0.4%. The absorbance spectra of BEHP-PPV and MEH-PPV neat films are also shown in the figure.
Figure 6E:
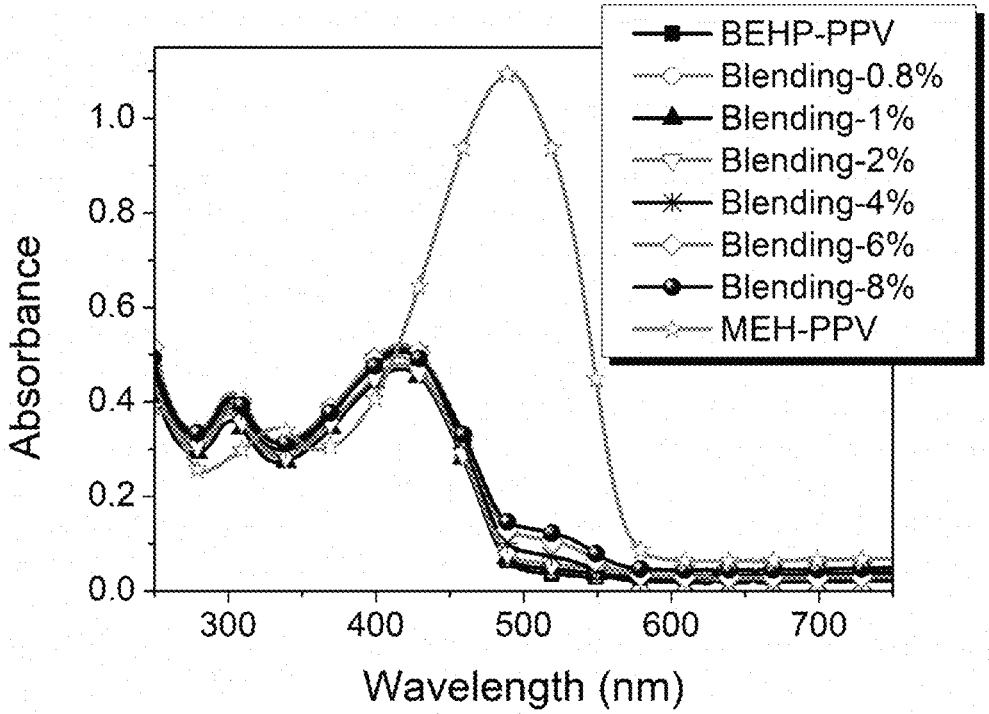
FIG. 6E shows absorbance spectra of BEHP-PPV:MEH-PPV blend system in neat films. The MEH-PPV concentrations are tuned in the range of 0.8%-8%. The absorbance spectra of BEHP-PPV and MEH-PPV neat films are also shown in the figure.
Figure 6F:
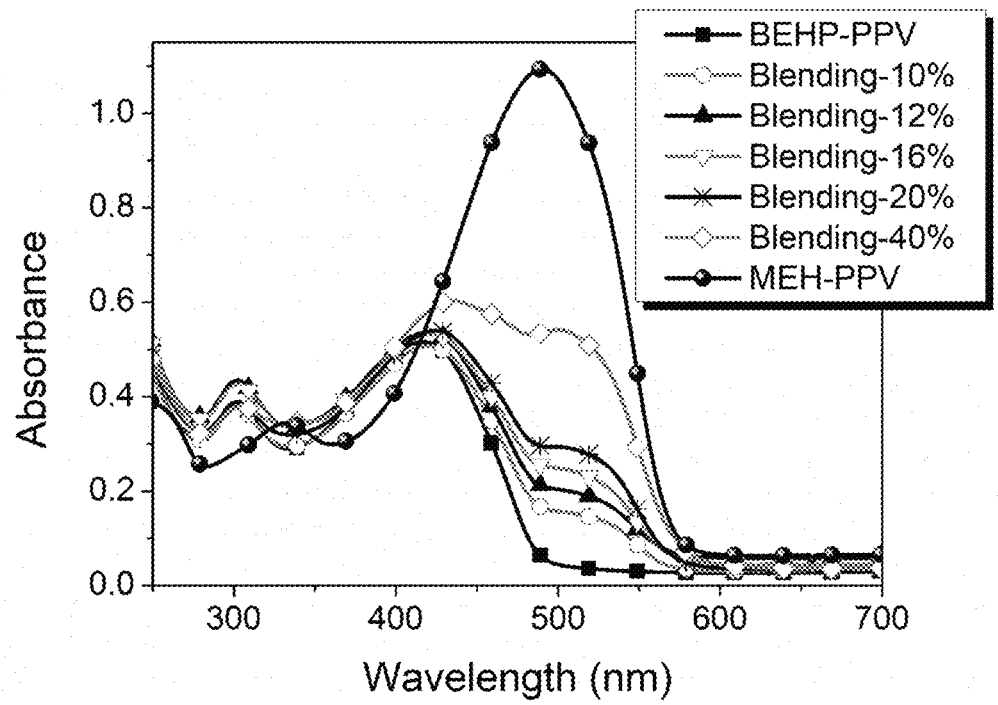
FIG. 6F shows absorbance spectra of BEHP-PPV:MEH-PPV blend system in neat films. The MEH-PPV concentrations are tuned in the range of 10%-40%. The absorbance spectra of BEHP-PPV and MEH-PPV neat films are also shown in the figure.
Figure 6G:
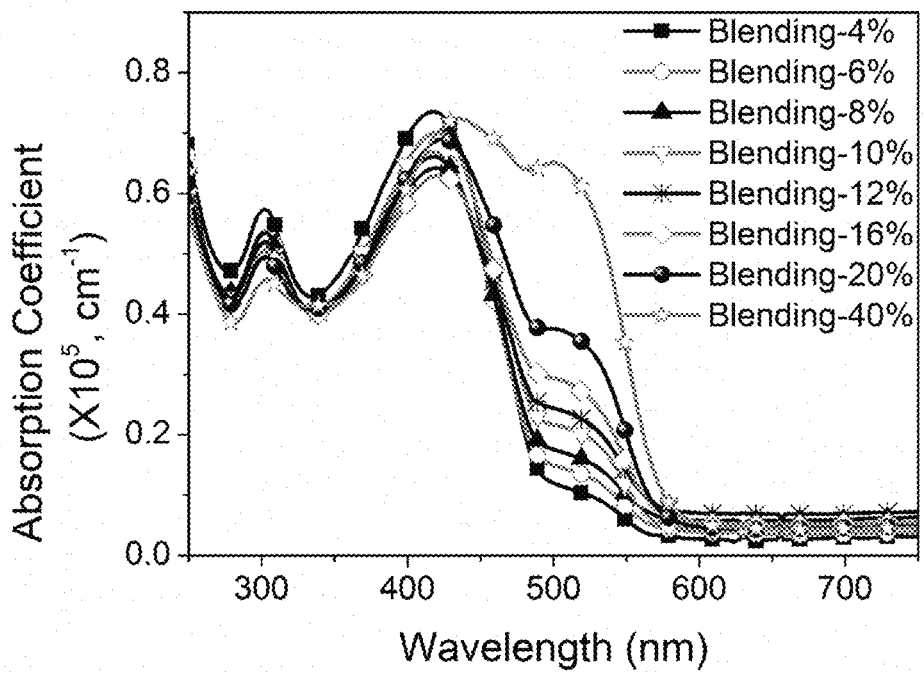
FIG. 6G shows absorption coefficient spectra of BEHP-PPV:MEH-PPV blend system in neat films. The MEH-PPV concentrations are tuned between 4%-40%.
Figure 7A:
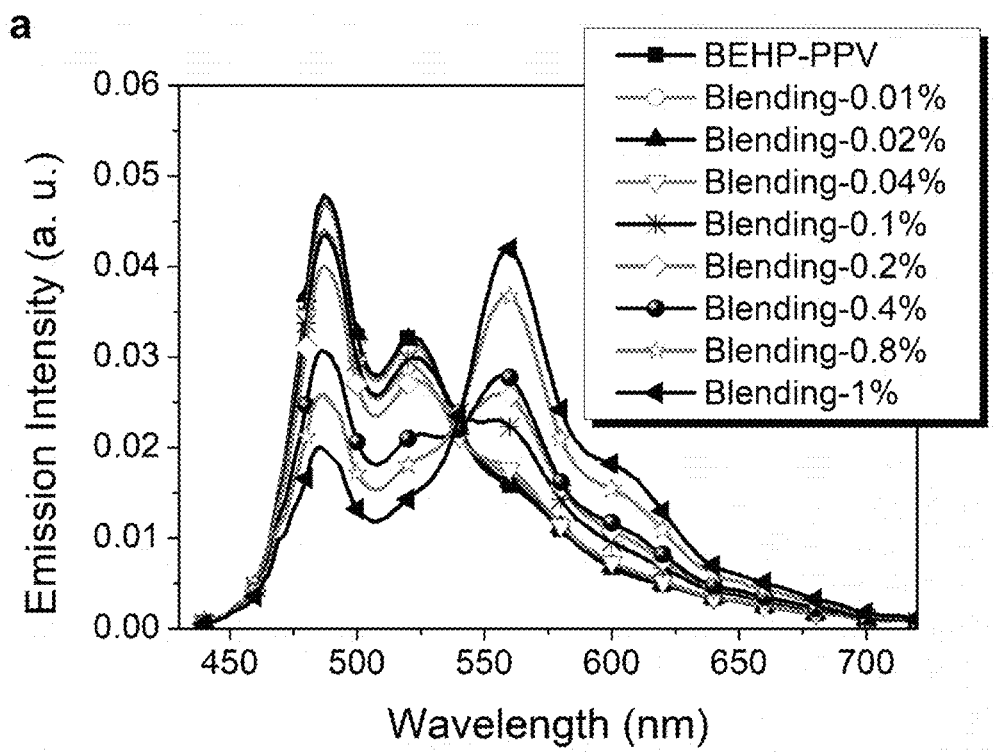
FIG. 7A shows PL spectra of BEHP-PPV:MEH-PPV blended samples. The MEH-PPV concentrations are tuned in the range of 0.01%-1%. The PL spectrum of BEHP-PPV neat film is also shown in the figure.
Figure 7B:
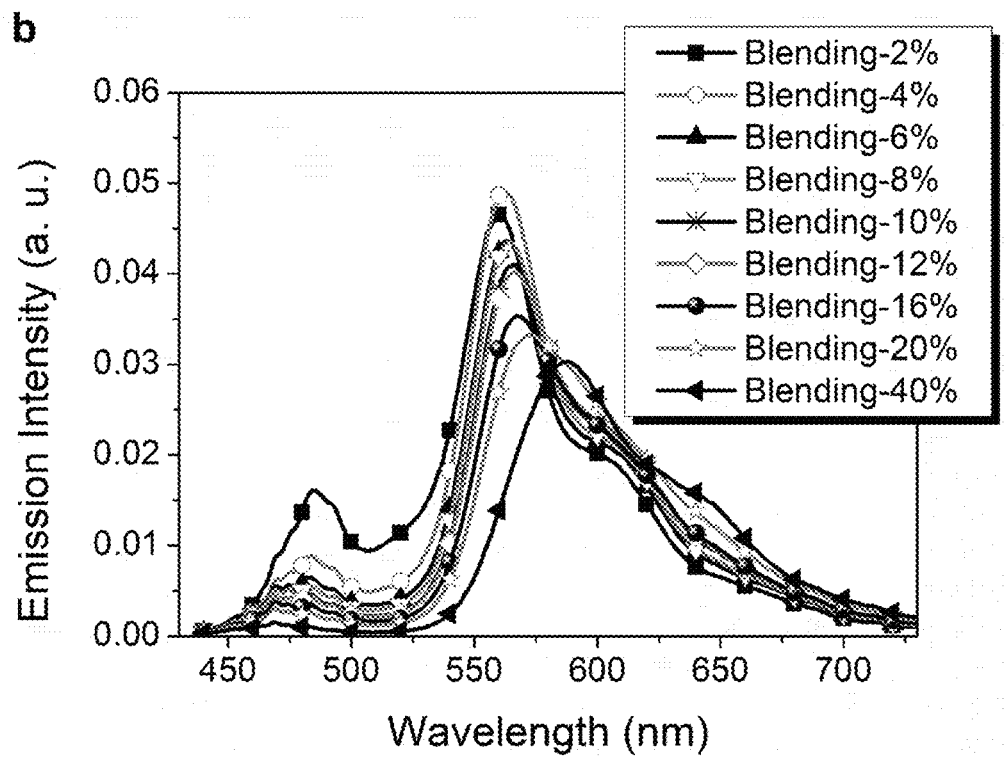
FIG. 7B shows PL spectra of BEHP-PPV:MEH-PPV blended samples. The MEH-PPV concentrations are tuned in the range of 2%-40%.
Figure 7C:
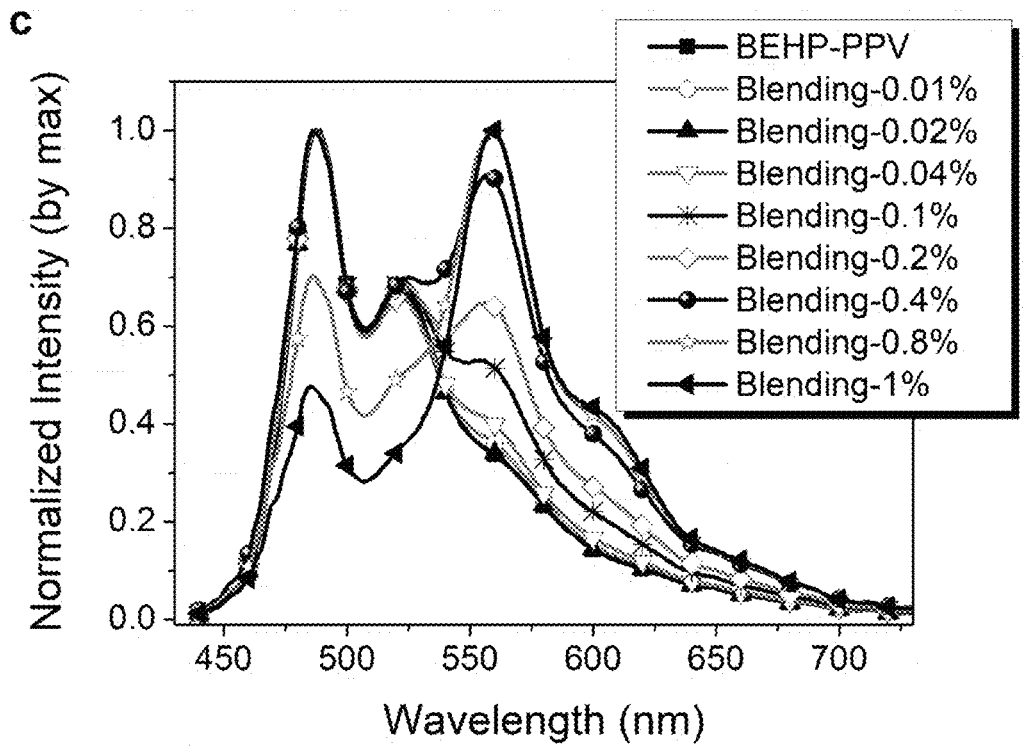
FIG. 7C shows PL spectra (normalize by max) of BEHP-PPV:MEH-PPV blended samples. The MEH-PPV concentrations are tuned in the range of 0.01%-1%. The PL spectrum (normalize by max) of BEHP-PPV neat film is also shown in the figure.
Figure 7D:
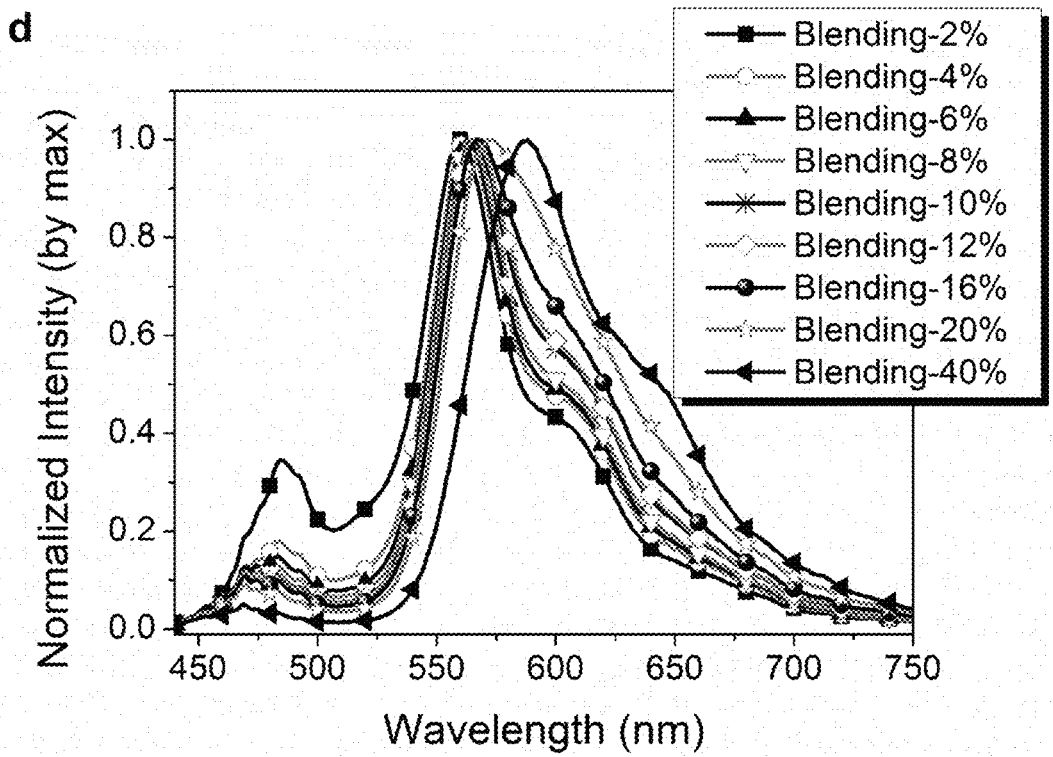
FIG. 7D shows PL spectra (normalize by max) of BEHP-PPV:MEH-PPV blended samples. The MEH-PPV concentrations are tuned in the range of 2%-40%.
Figure 7E:
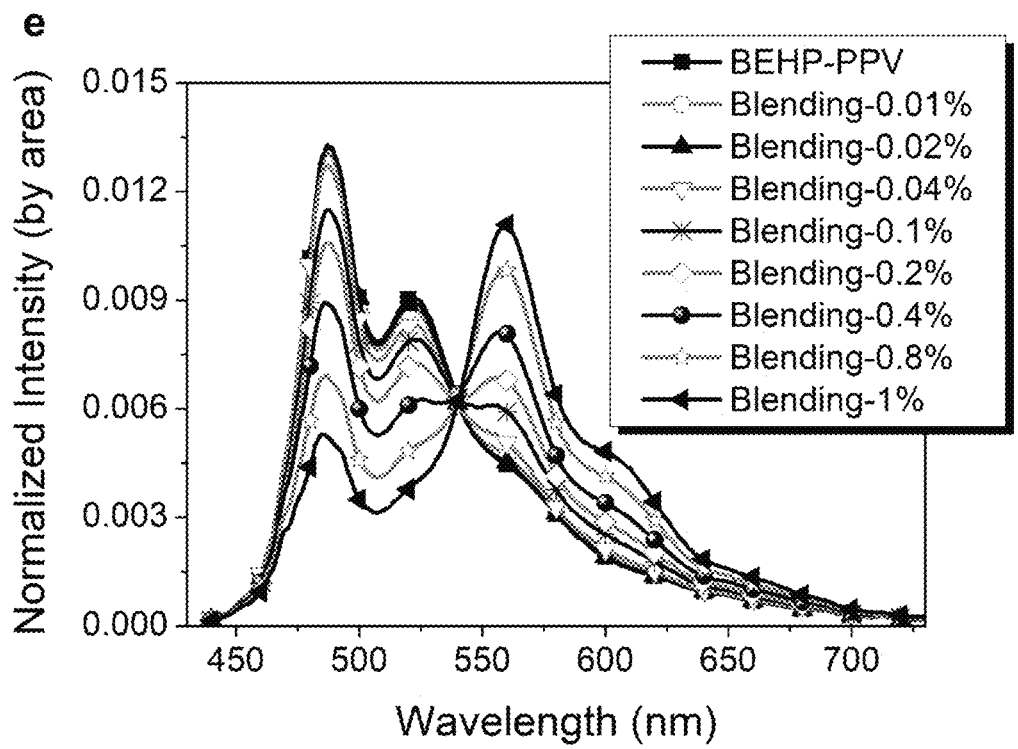
FIG. 7E shows PL spectra (normalize by area) of BEHP-PPV:MEH-PPV blended samples. The MEH-PPV concentrations are tuned in the range of 0.01%-1%. The PL spectrum (normalize by area) of BEHP-PPV neat film is also shown in the figure.
Figure 7F:
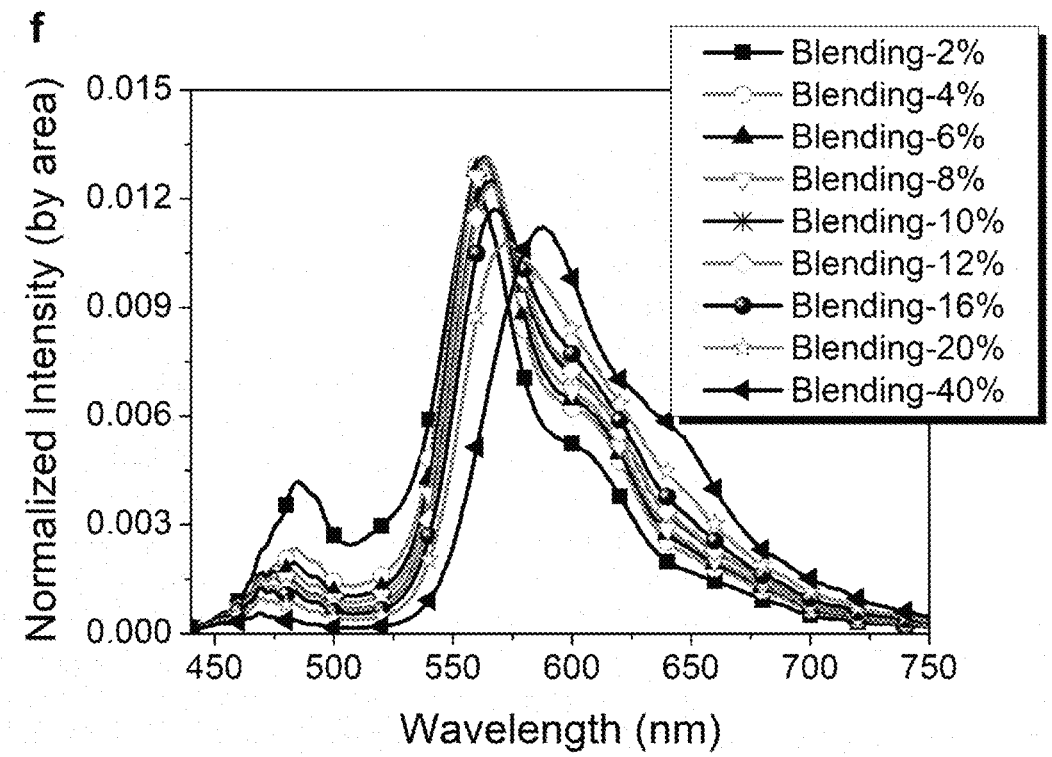
FIG. 7F shows PL spectra (normalize by area) of BEHP-PPV:MEH-PPV blended samples. The MEH-PPV concentrations are tuned in the range of 2%-40%.

The films of blended polymer were deposited by spin-coating the mixed solutions on quartz substrates. The spin-coating speed is between 500 rpm to 8000 rpm. The accelerated speed is between 500 rpm/s to 4000 rpm/s. The thickness information is listed in Table 2. The film thicknesses of the blended samples are ~(150±40) nm (Table 2 and FIG. 5), which are suitable for forming waveguide structures in these films for ASE measurement.

TABLE 2

Thickness information of blended samples.

| Sample | Thickness (nm) | Sample | Thickness (nm) | Sample | Thickness (nm) |
|---|---|---|---|---|---|
| Blending-0.01% | 166 | Blending-0.02% | 161 | Blending-0.04% | 152 |
| Blending-0.1% | 152 | Blending-0.2% | 166 | Blending-0.4% | 162 |
| Blending-0.8% | 120 | Blending-1% | 139 | Blending-2% | 149 |
| Blending-4% | 161 | Blending-6% | 180 | Blending-8% | 176 |
| Blending-10% | 167 | Blending-12% | 192 | Blending-16% | 195 |
| Blending-20% | 180 | Blending-40% | 192 | MEH-PPV | 165 |

Figure 8:
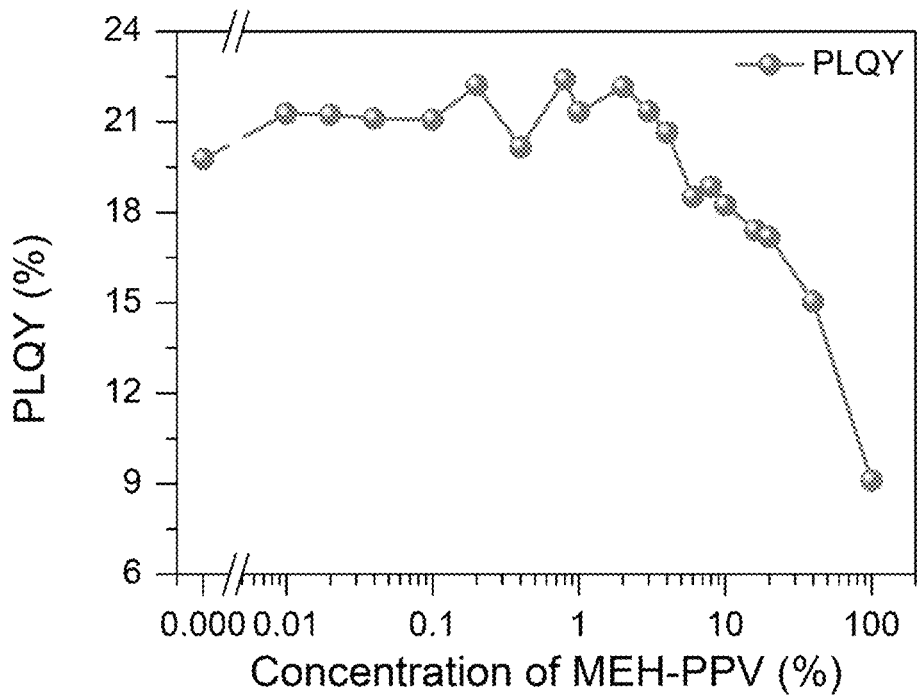
FIG. 8 shows the PL quantum yield (PLQY) value of blended film as a function of MEH-PPV concentration excited at 390 nm.
Figure 9A:
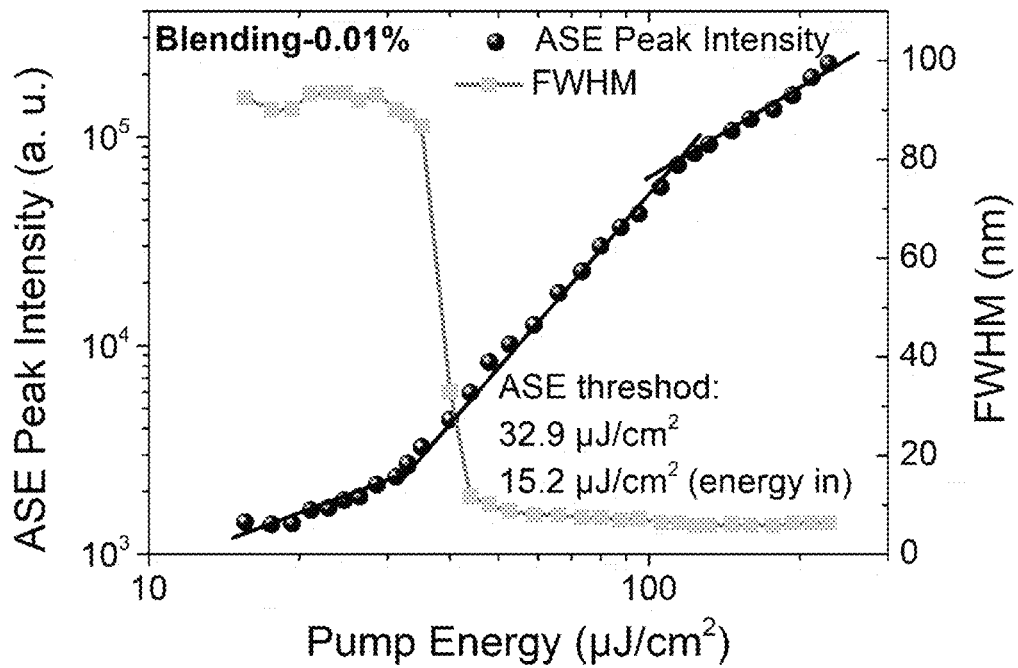
FIG. 9A shows the ASE result of the blended sample with MEH-PPV concentration of 0.01% for amplification wavelength around 525 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 9B:
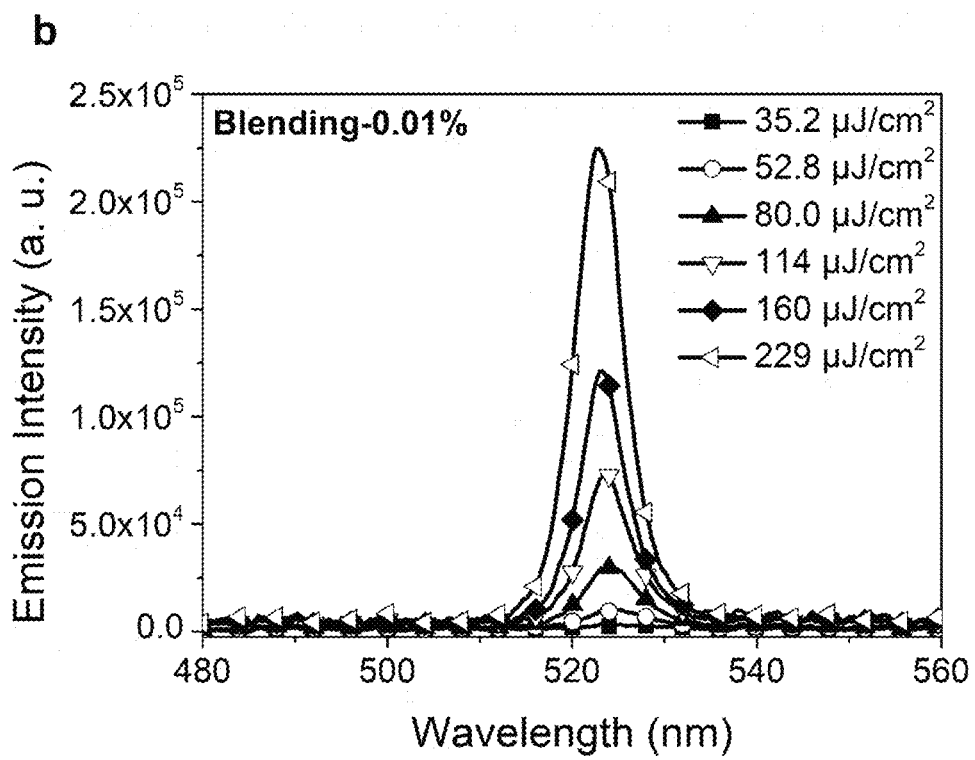
FIG. 9B shows the emission spectra for the planar waveguide of the blended sample with MEH-PPV concentration of 0.01%.
Figure 9C:
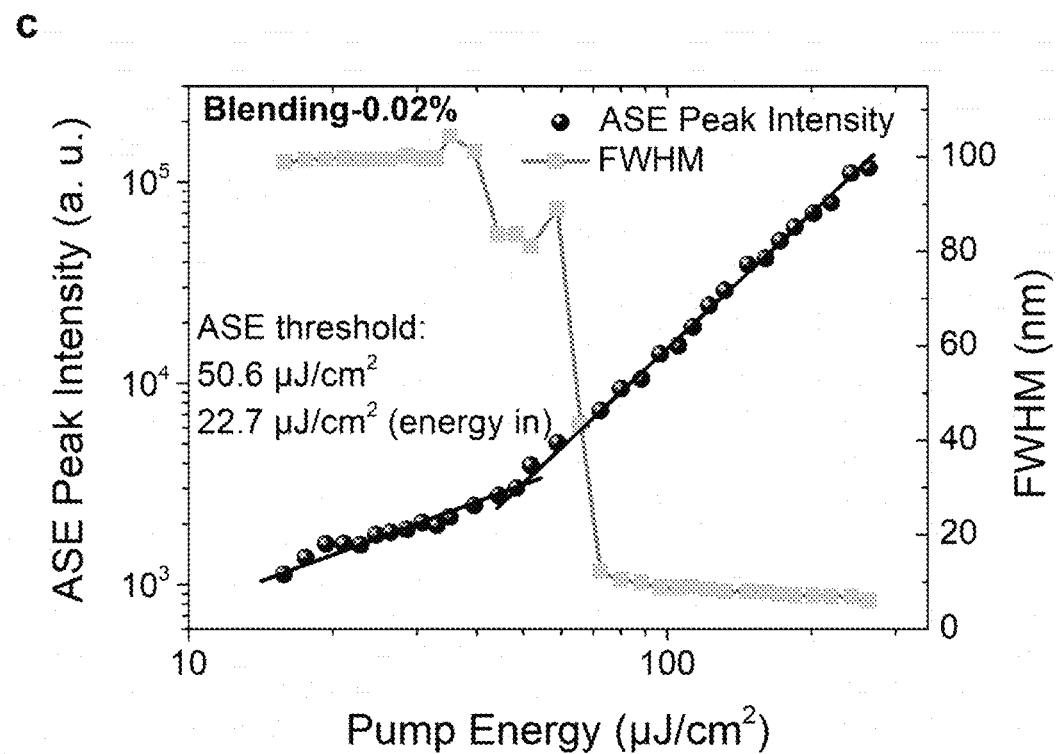
FIG. 9C shows the ASE result of the blended sample with MEH-PPV concentration of 0.02% for amplification wavelength around 525 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 9D:
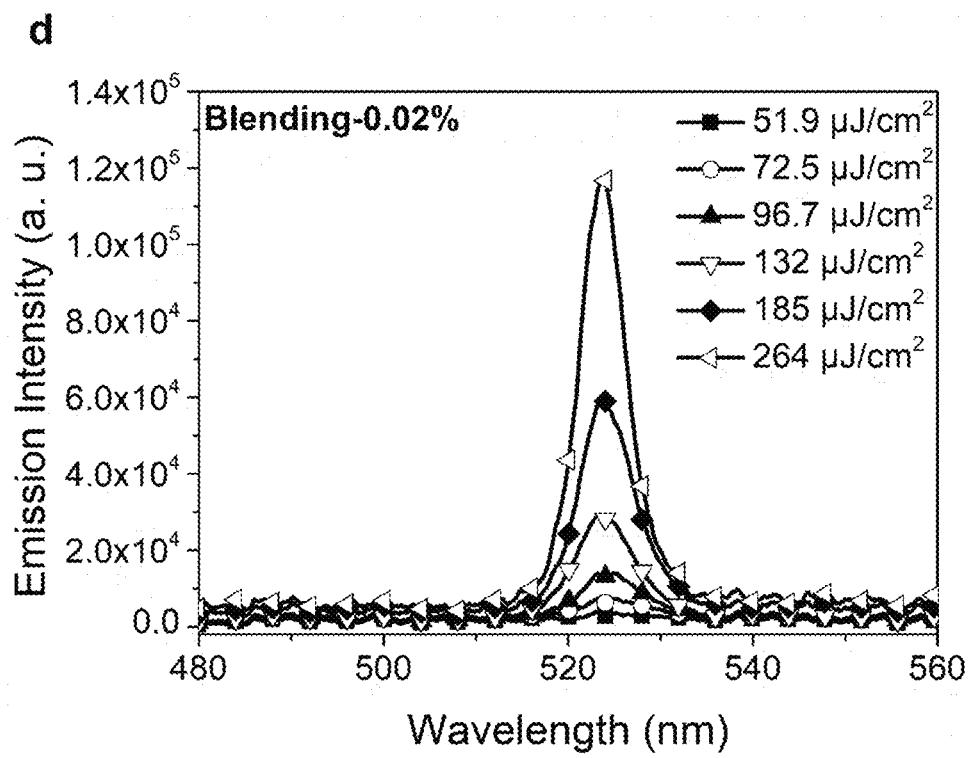
FIG. 9D shows the emission spectra for the planar waveguide of the blended sample with MEH-PPV concentration of 0.02%.
Figure 9E:
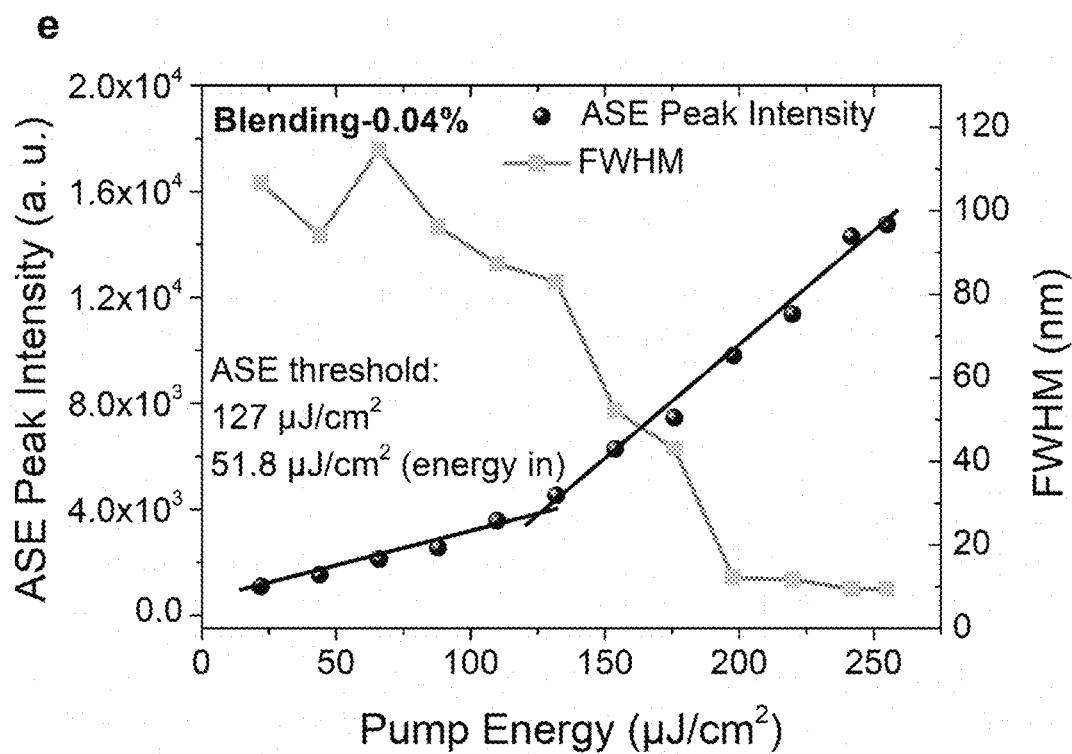
FIG. 9E shows the ASE result of the blended sample with MEH-PPV concentration of 0.04% for amplification wavelength around 525 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 9F:
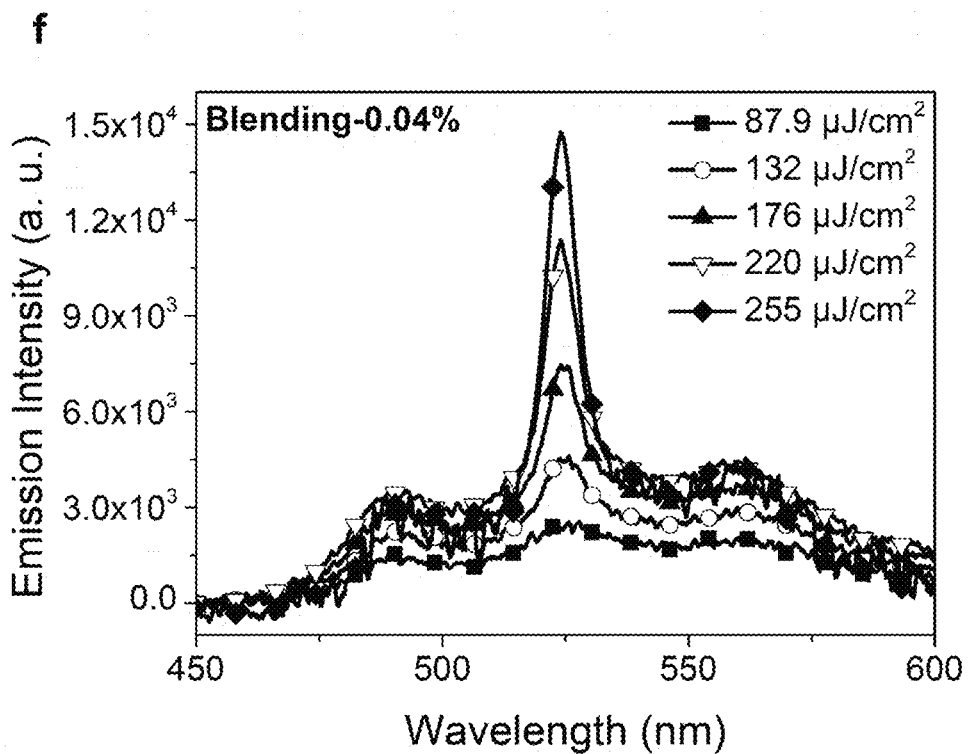
FIG. 9F shows the emission spectra for the planar waveguide of the blended sample with MEH-PPV concentration of 0.04%.

The transmission and absorbance spectra of these blended samples are involved the transmission and absorption signals of both BEHP-PPV and MEH-PPV (FIGS. 6A to 6G). The MEH-PPV fluorescence are gradually increased with respect to the increase of MEH-PPV ratio, representing the energy transfer in this process (FIGS. 7A to 7F). The PLQY values are within 9%-22% (FIG. 8).

Figure 10A:
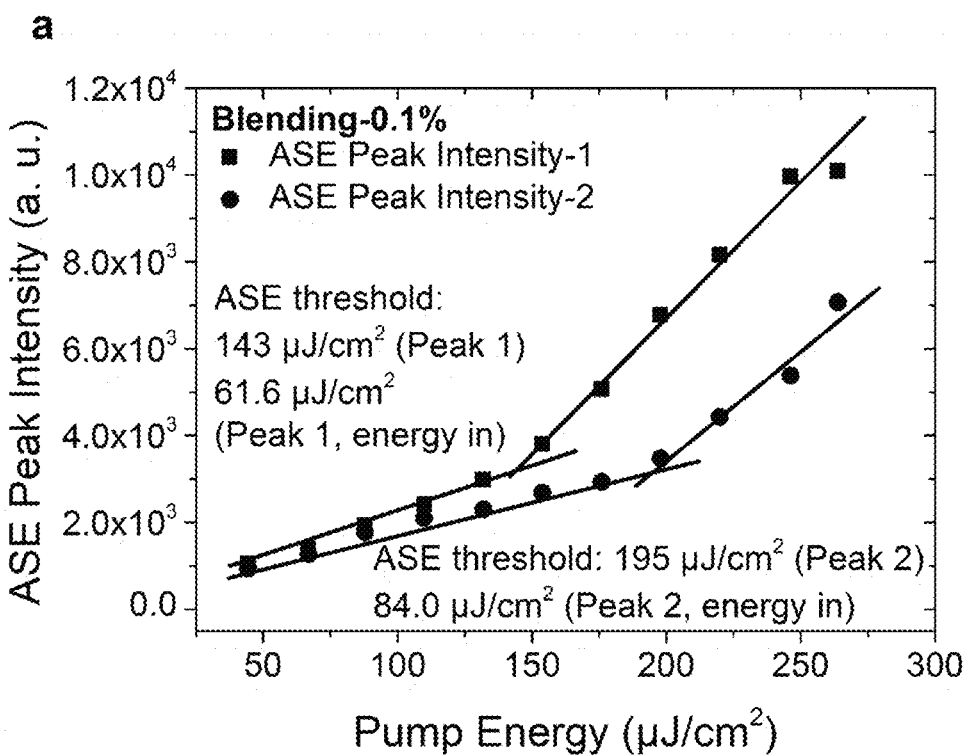
FIG. 10A shows the ASE result of the blended sample with MEH-PPV concentration of 0.1% for dual-wavelengths amplification at 524 nm and 563 nm. The corresponding output intensity (solid squares and spheres) of the blended sample with 0.1% MEH-PPV fraction at different amplification peaks as a function of the pump energy density. The ASE threshold value and ASE threshold (energy in) value are estimated with or without taking into account of transmission loss, respectively.
Figure 10B:
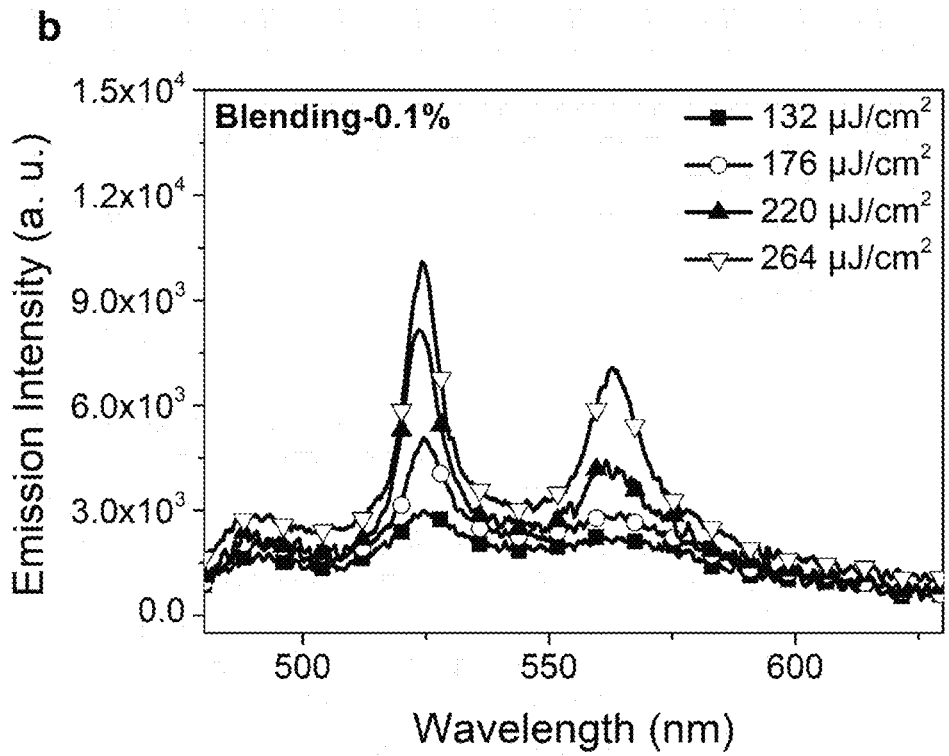
FIG. 10B shows the emission spectra for the planar waveguide of the blended sample with MEH-PPV concentration of 0.1%.
Figure 11A:
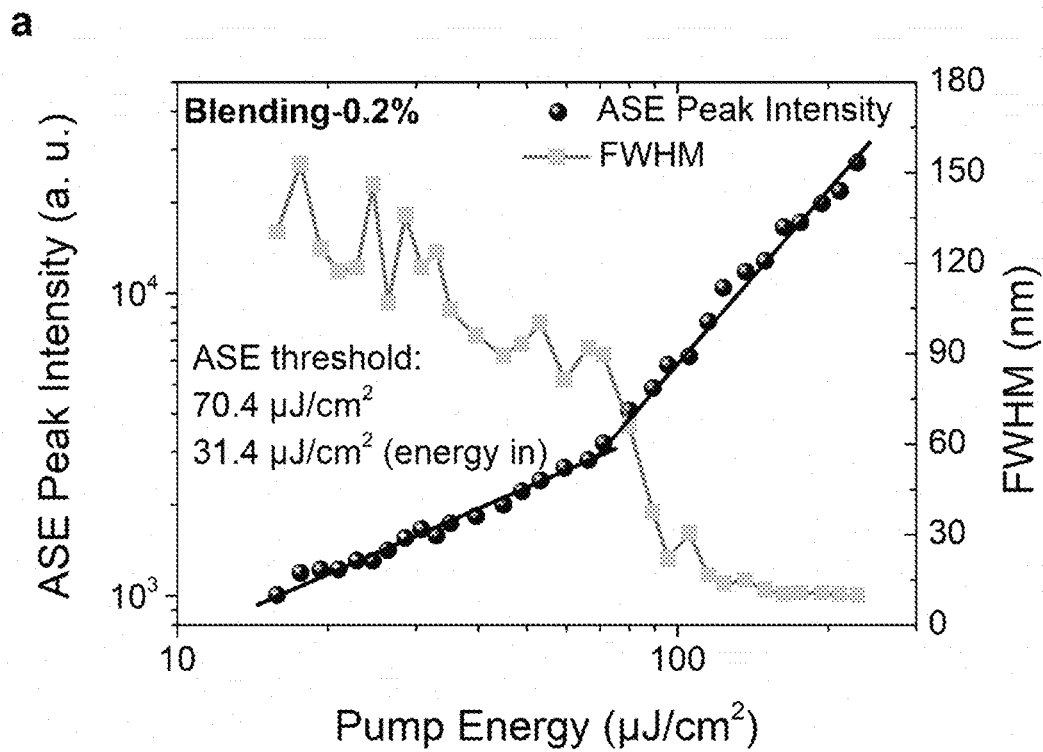
FIG. 11A shows the ASE result of the blended sample with MEH-PPV concentration of 0.2% for amplification wavelength around 570 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 11B:
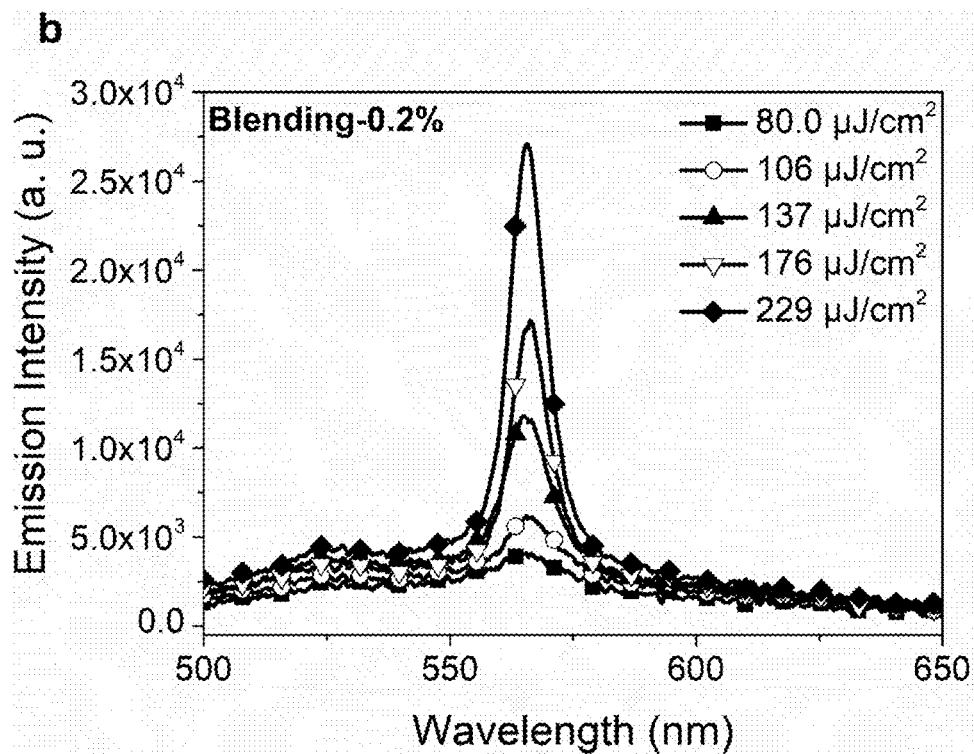
FIG. 11B shows the emission spectra for the planar waveguide of the blended sample with MEH-PPV concentration of 0.2%.
Figure 11C:
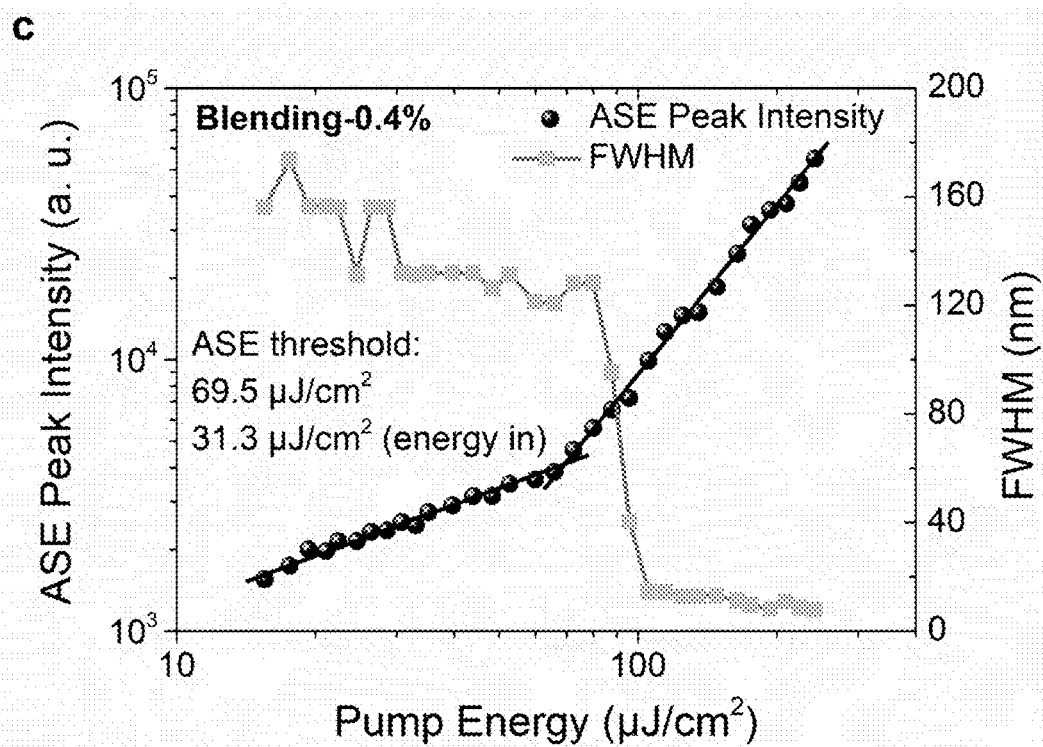
FIG. 11C shows the ASE result of the blended sample with MEH-PPV concentration of 0.4% for amplification wavelength around 570 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 11D:
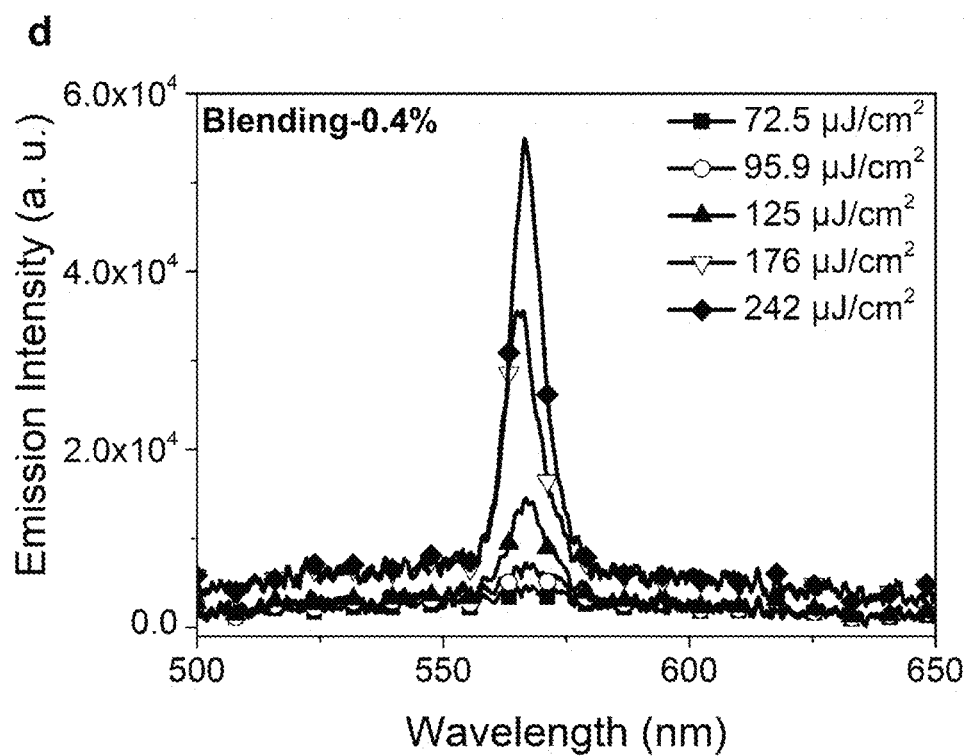
FIG. 11D shows the emission spectra for the planar waveguide of the blended sample with MEH-PPV concentration of 0.4%.
Figure 11E:
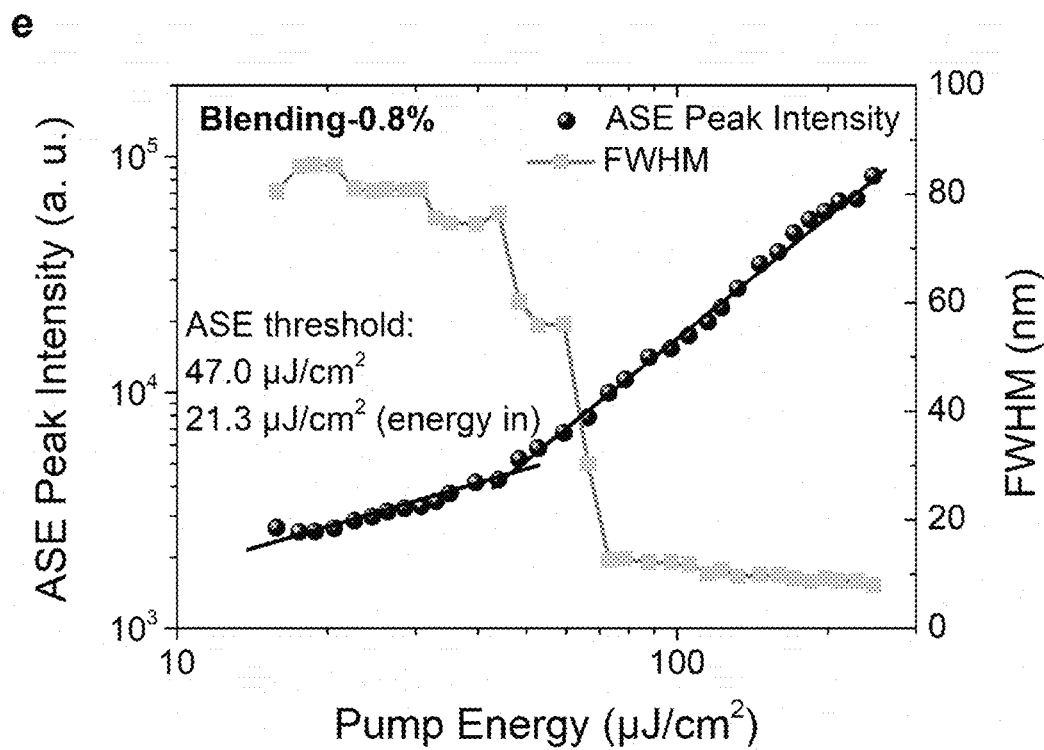
FIG. 11E shows the ASE result of the blended sample with MEH-PPV concentration of 0.8% for amplification wavelength around 570 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 11F:
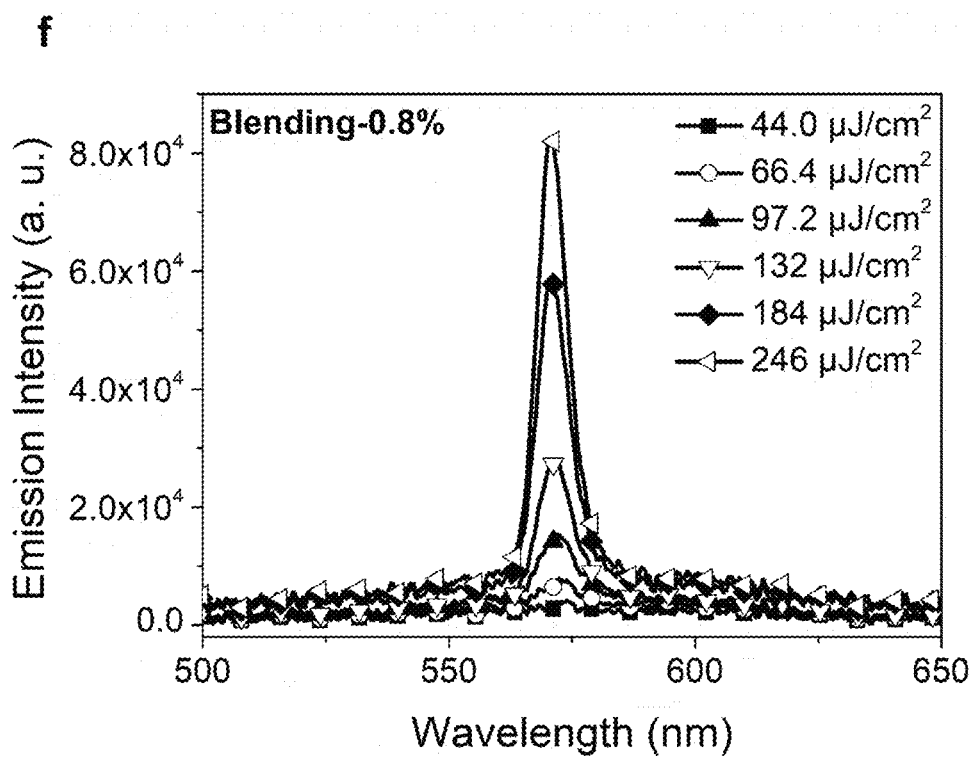
FIG. 11F shows the emission spectra for the planar waveguide of the blended sample with MEH-PPV concentration of 0.8%.
Figure 11G:
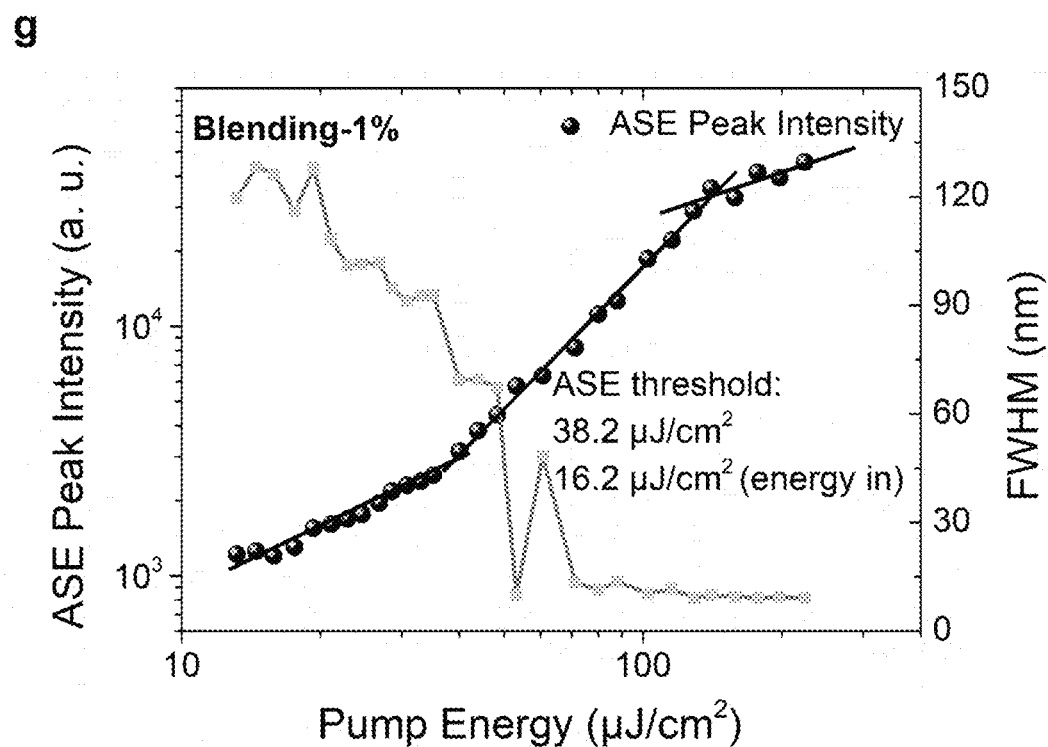
FIG. 11G shows the ASE result of the blended sample with MEH-PPV concentration of 1% for amplification wavelength around 570 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 11H:
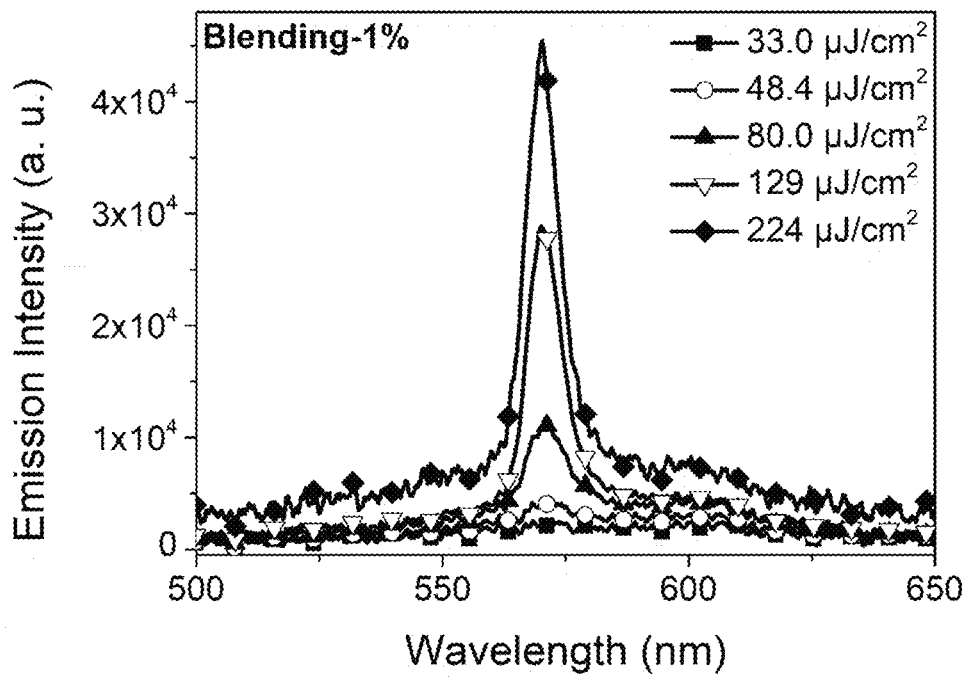
FIG. 11H shows the emission spectra for the planar waveguide of the blended sample with MEH-PPV concentration of 1%.
Figure 11I:
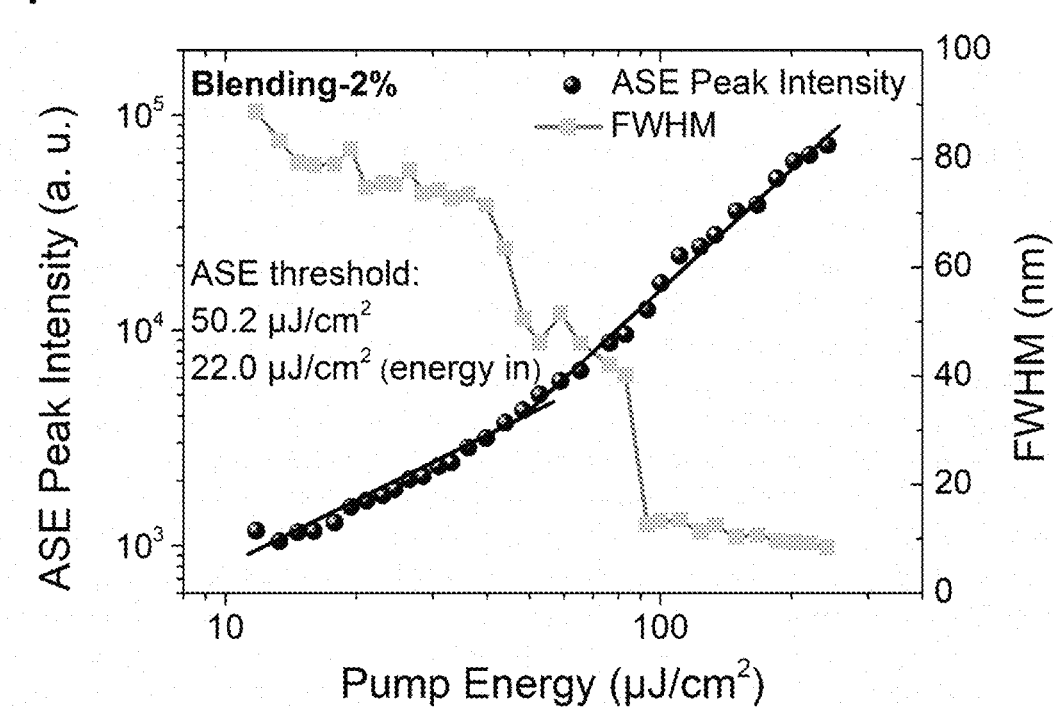
FIG. 11I shows the ASE result of the blended sample with MEH-PPV concentration of 2% for amplification wavelength around 570 nm. FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 11J:
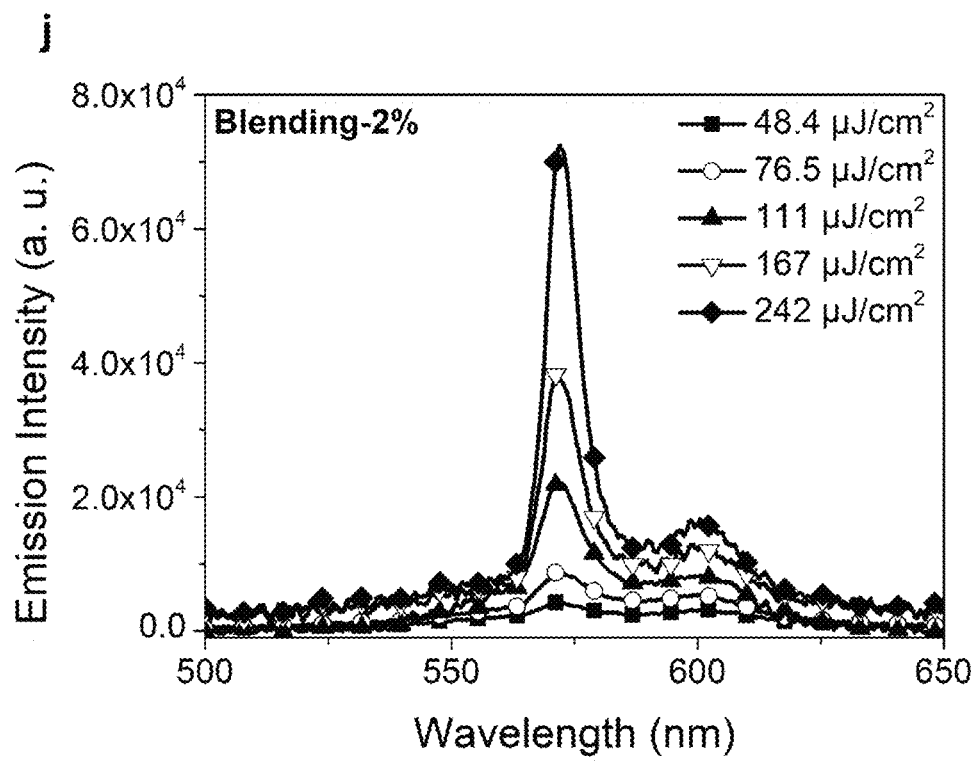
FIG. 11J shows the emission spectra for the planar waveguide of the blended sample with MEH-PPV concentration of 2%.
Figure 12A:
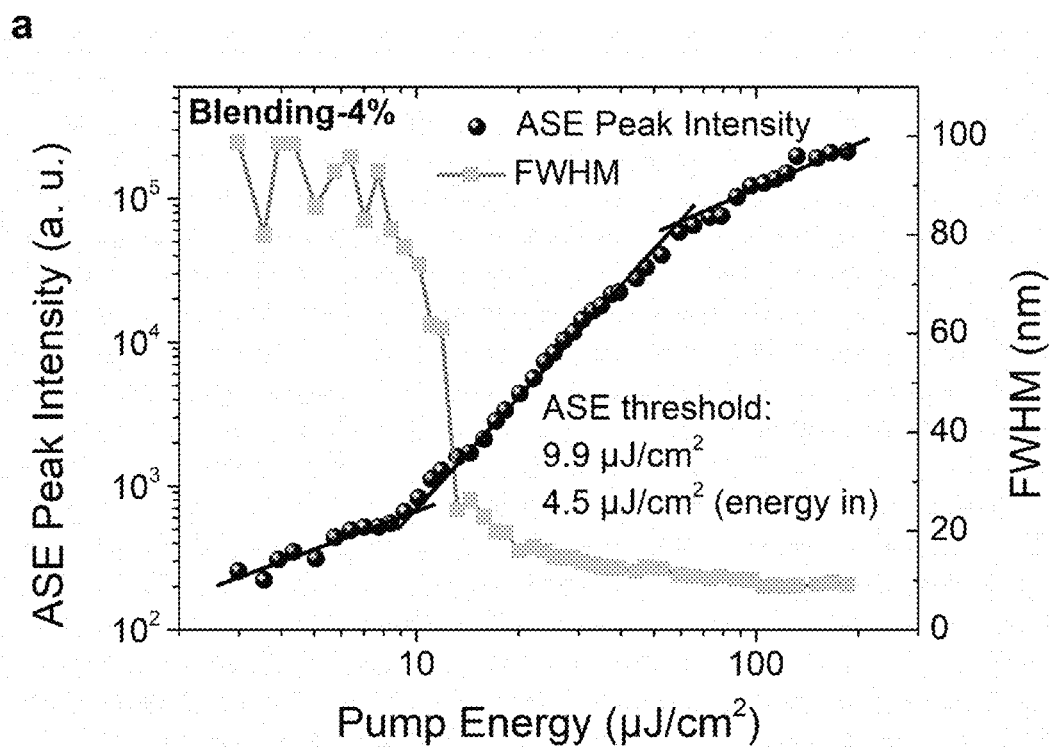
FIG. 12A shows the ASE result of the blended sample with MEH-PPV concentration of 4% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12B:
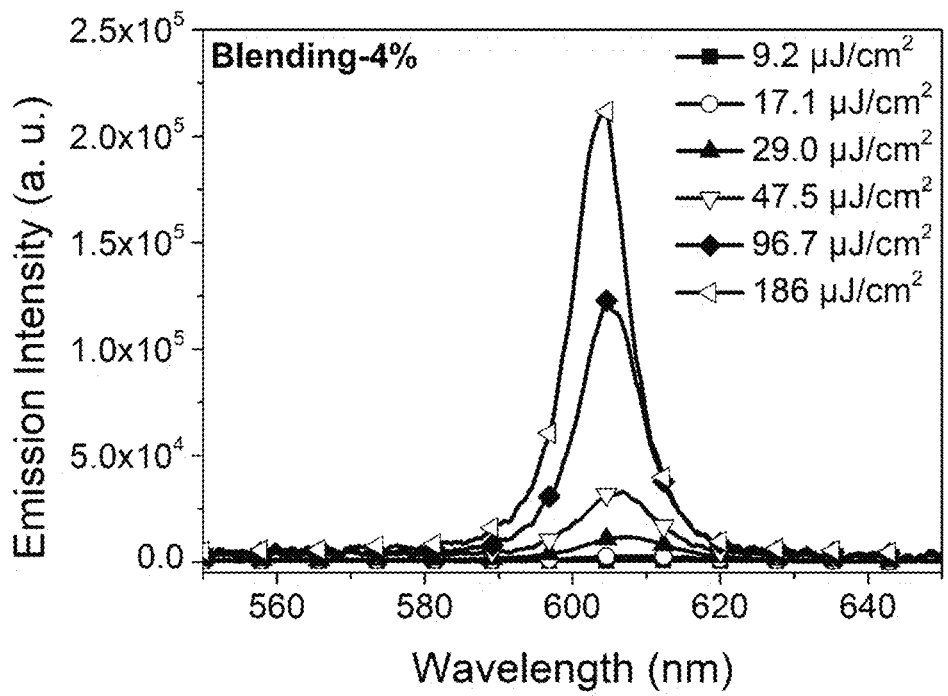
FIG. 12B shows the emission spectra for the planar waveguide of the blended sample with MEH-PPV concentration of 4%.
Figure 12C:
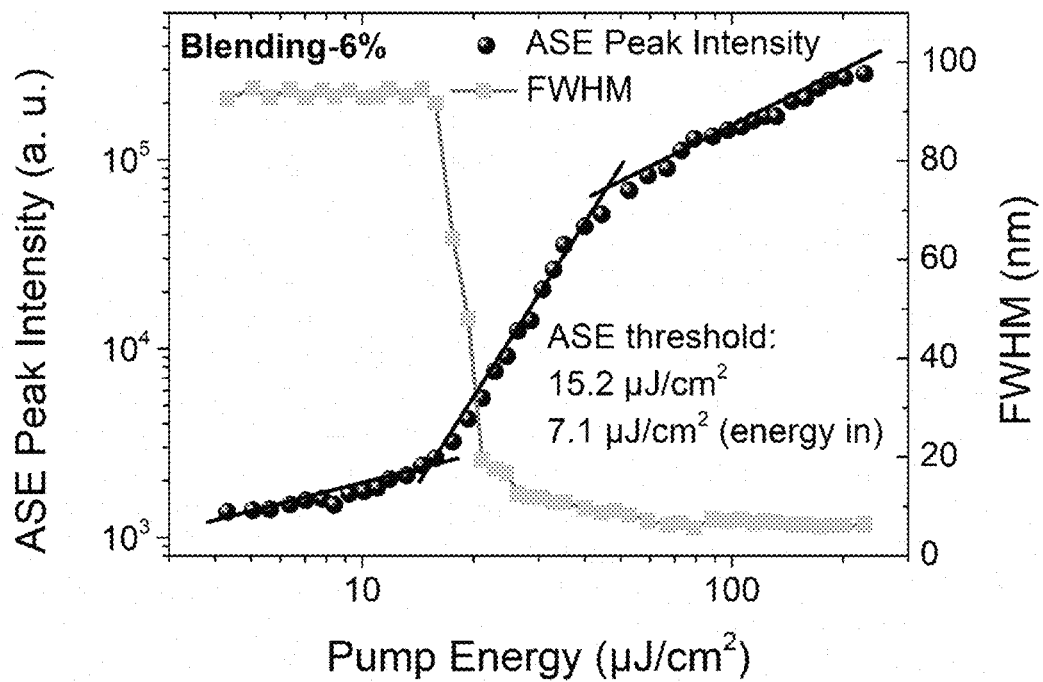
FIG. 12C shows the ASE result of the blended sample with MEH-PPV concentration of 6% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12D:
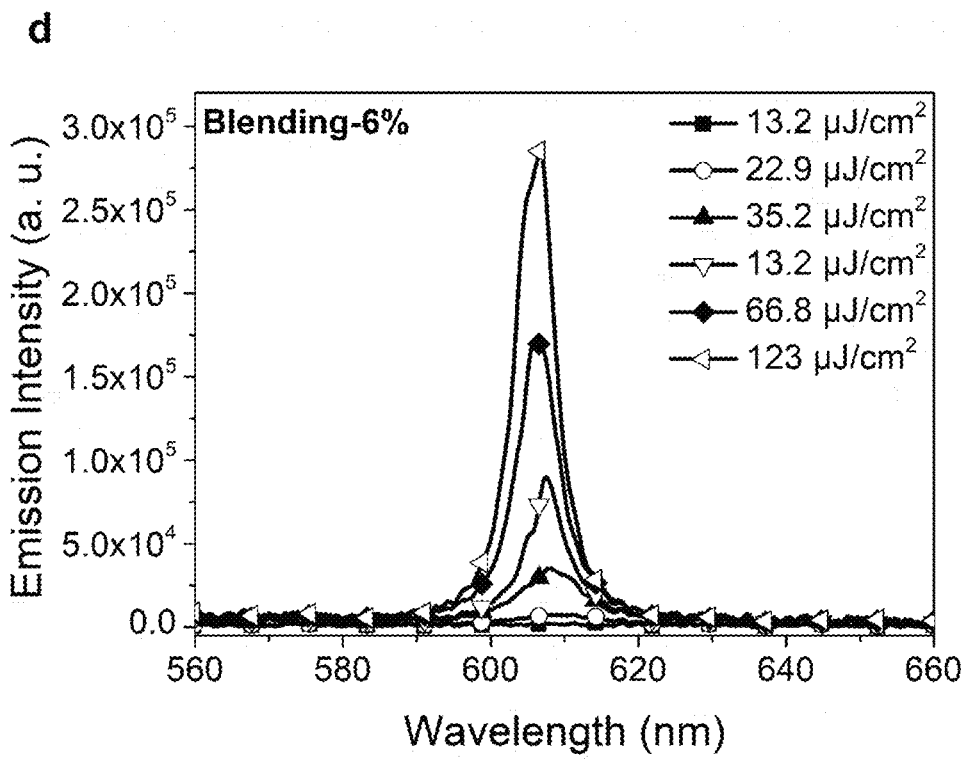
FIG. 12D shows the emission spectra for the planar waveguide of the blended sample with MEH-PPV concentration of 6%.
Figure 12E:
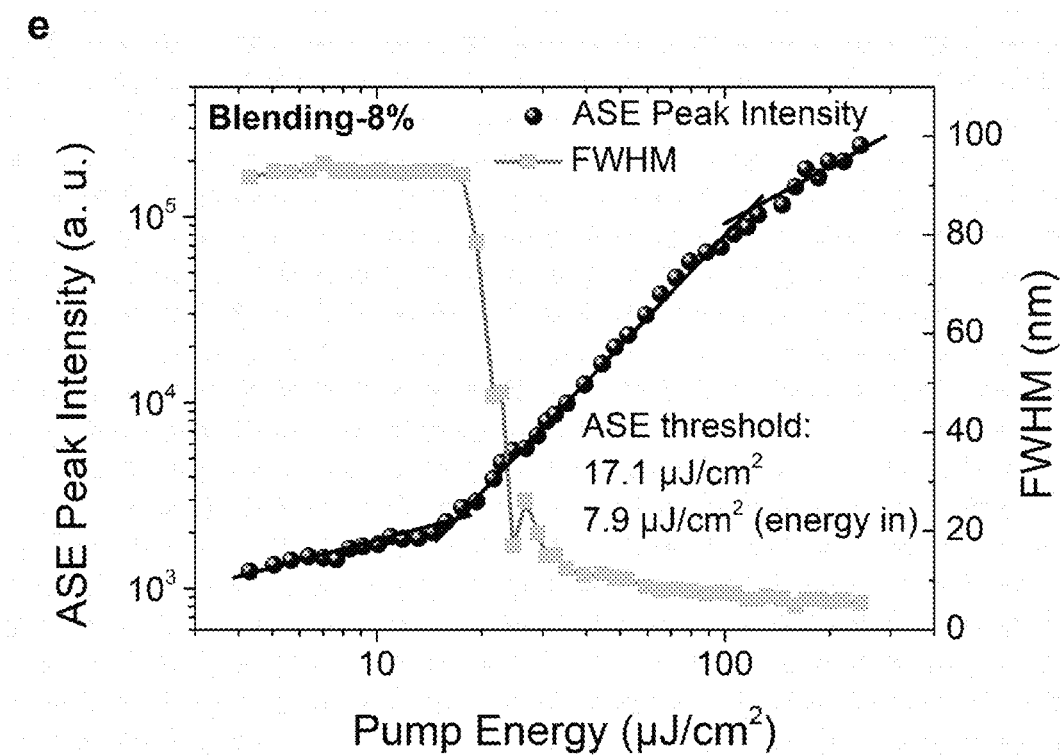
FIG. 12E shows the ASE result of the blended sample with MEH-PPV concentration of 8% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12F:
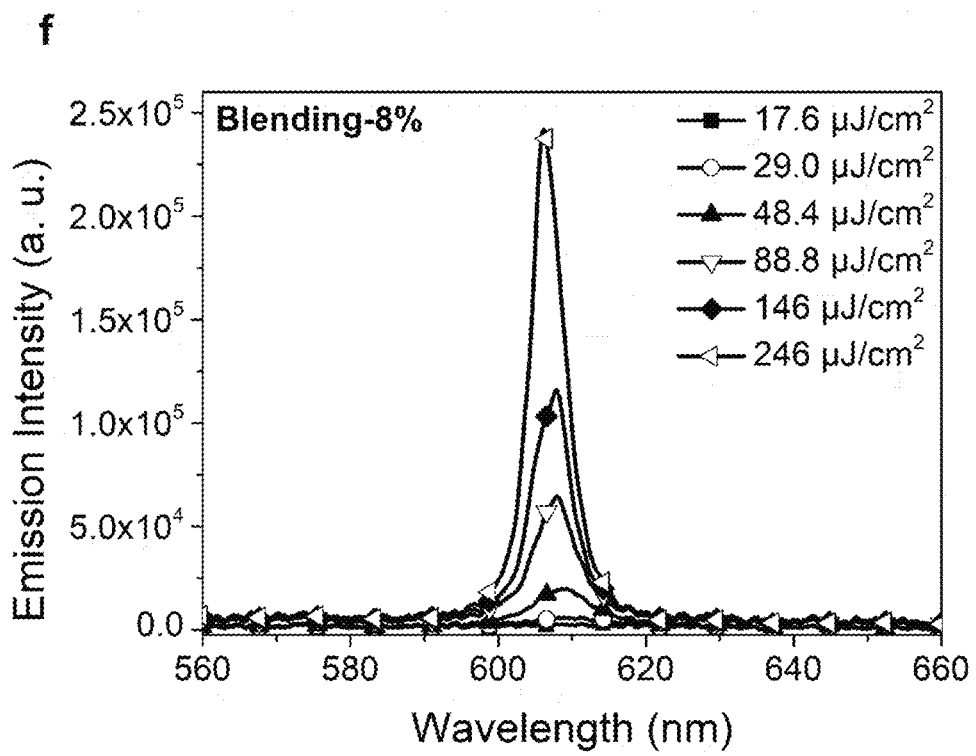
FIG. 12F shows the emission spectra for the planar waveguide of the blended sample with MEH-PPV concentration of 8%.
Figure 12G:
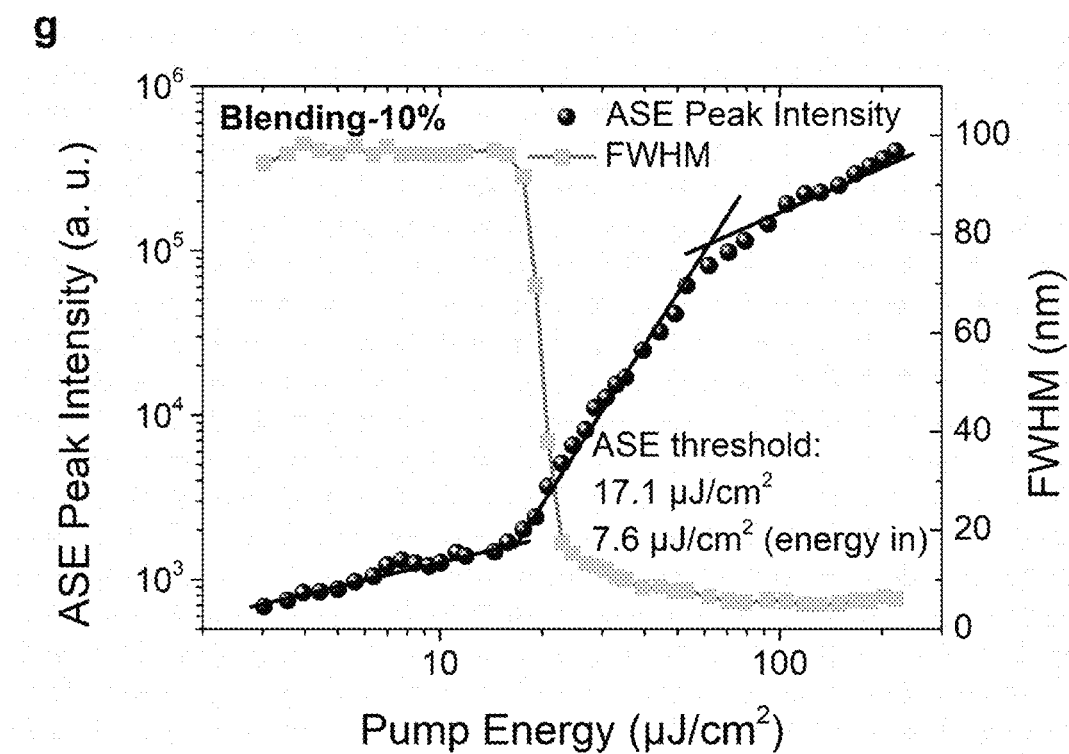
FIG. 12G shows the ASE result of the blended sample with MEH-PPV concentration of 10% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12H:
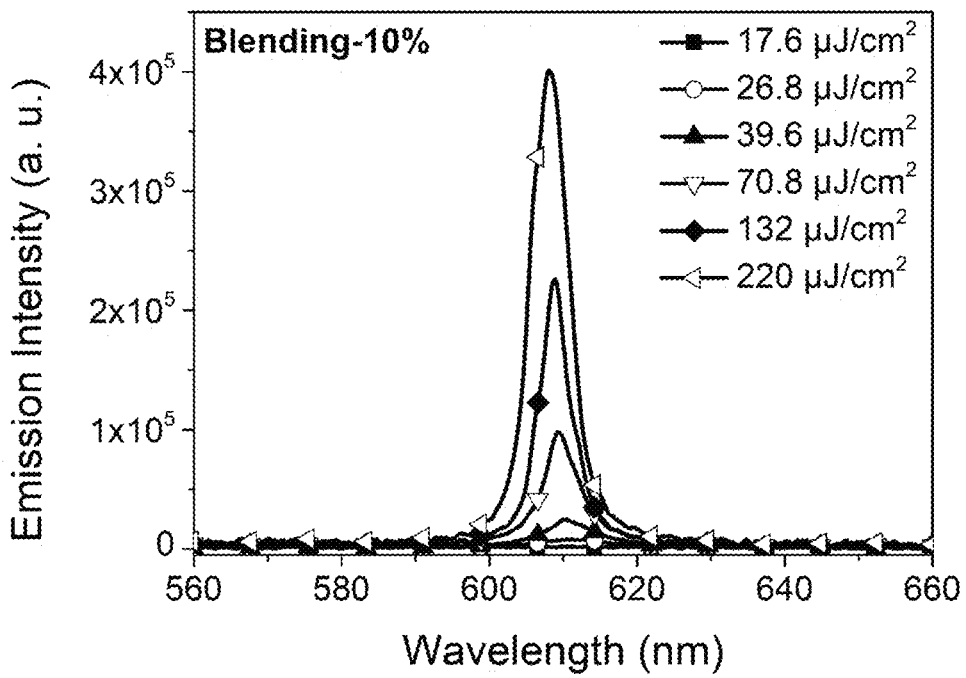
FIG. 12H shows the emission spectra for the planar waveguide of the blended sample with MEH-PPV concentration of 10%.
Figure 12I:
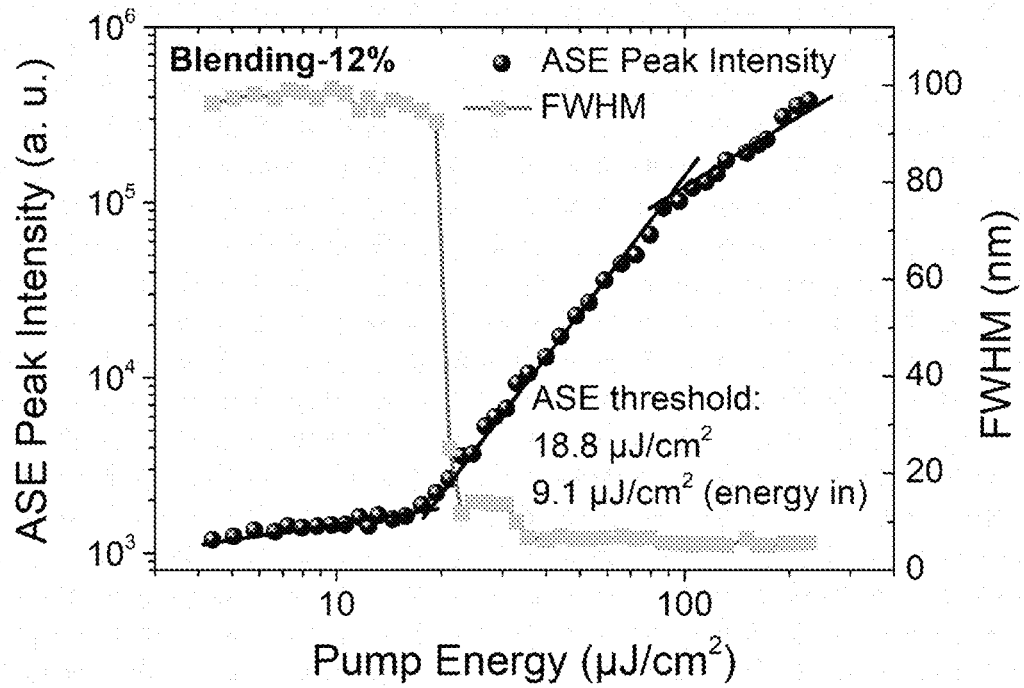
FIG. 12I shows the ASE result of the blended sample with MEH-PPV concentration of 12% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12J:
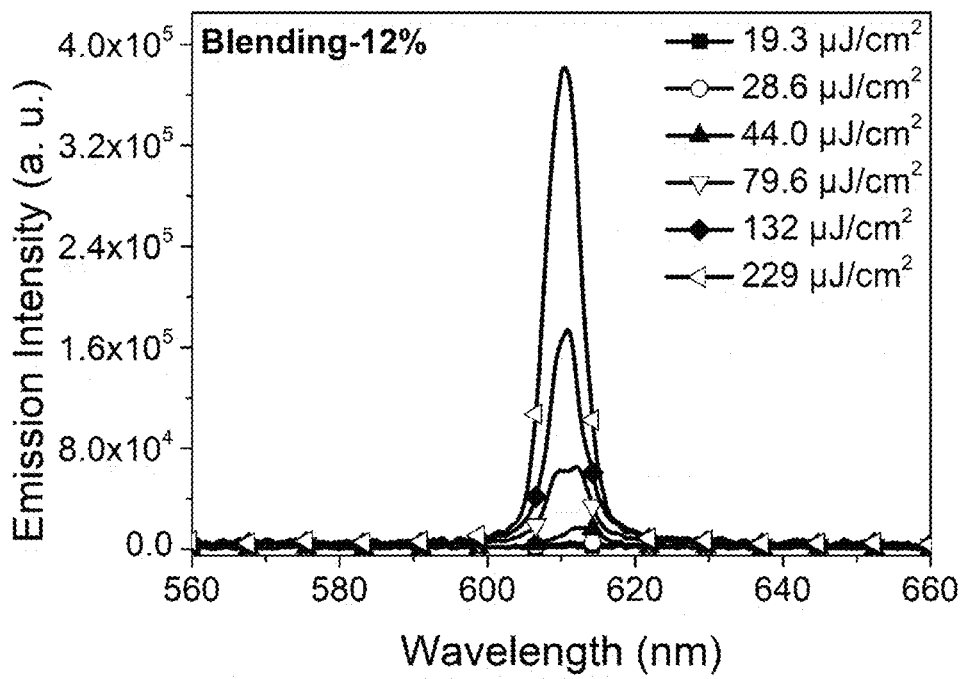
FIG. 12J shows the emission spectra for the planar waveguide of the blended sample with MEH-PPV concentration of 12%.
Figure 12K:
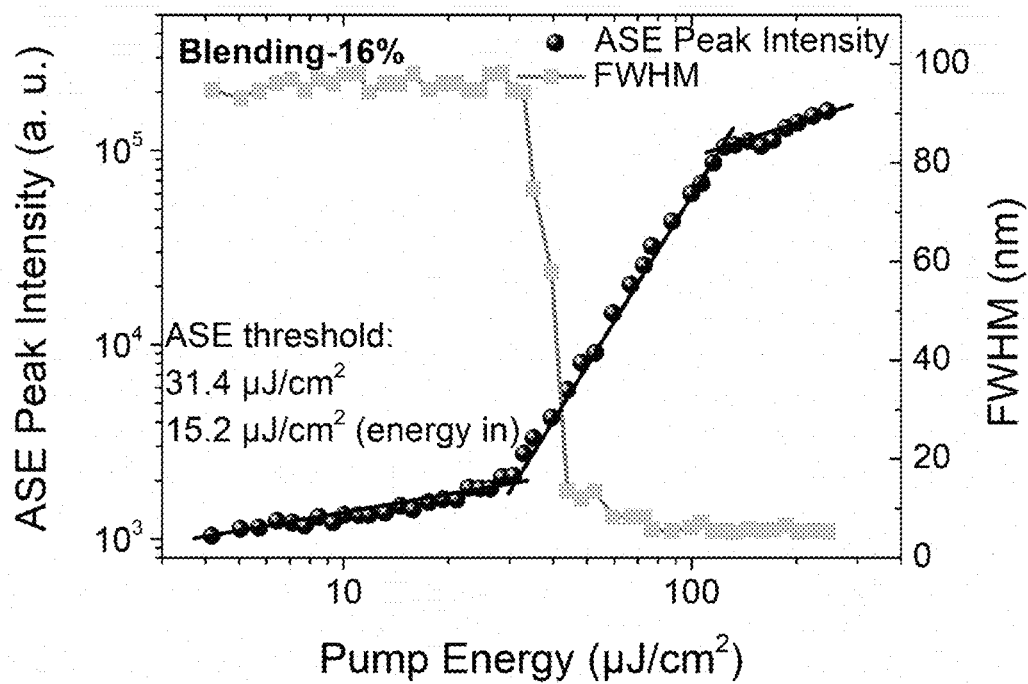
FIG. 12K shows the ASE result of the blended sample with MEH-PPV concentration of 16% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12L:
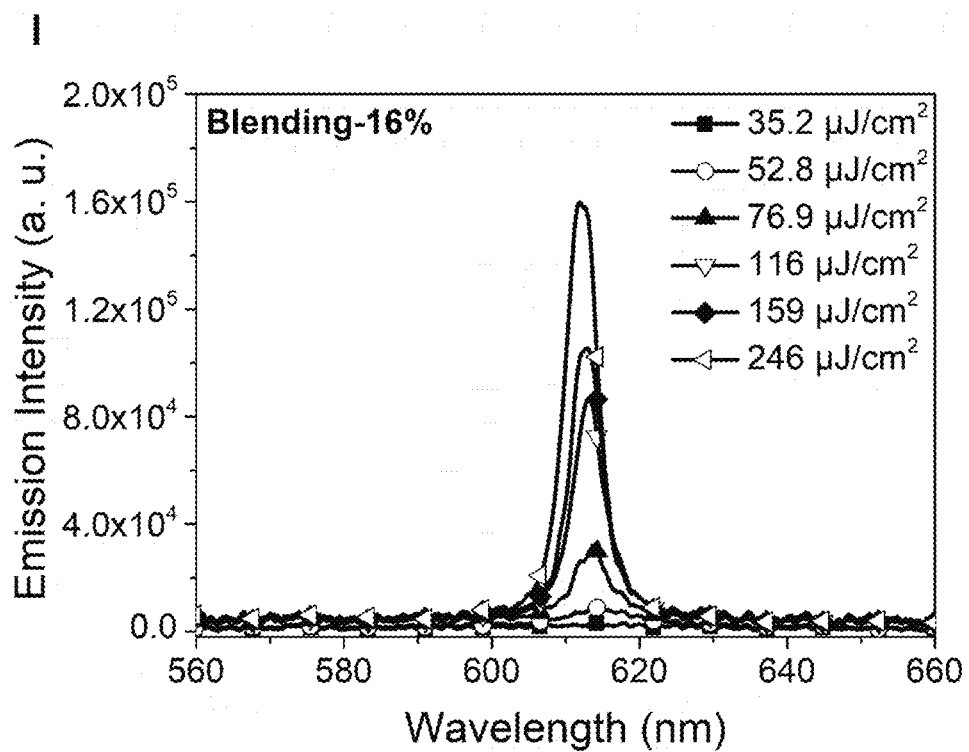
FIG. 12L shows the emission spectra for the planar waveguide of the blended sample with MEH-PPV concentration of 16%.
Figure 12M:
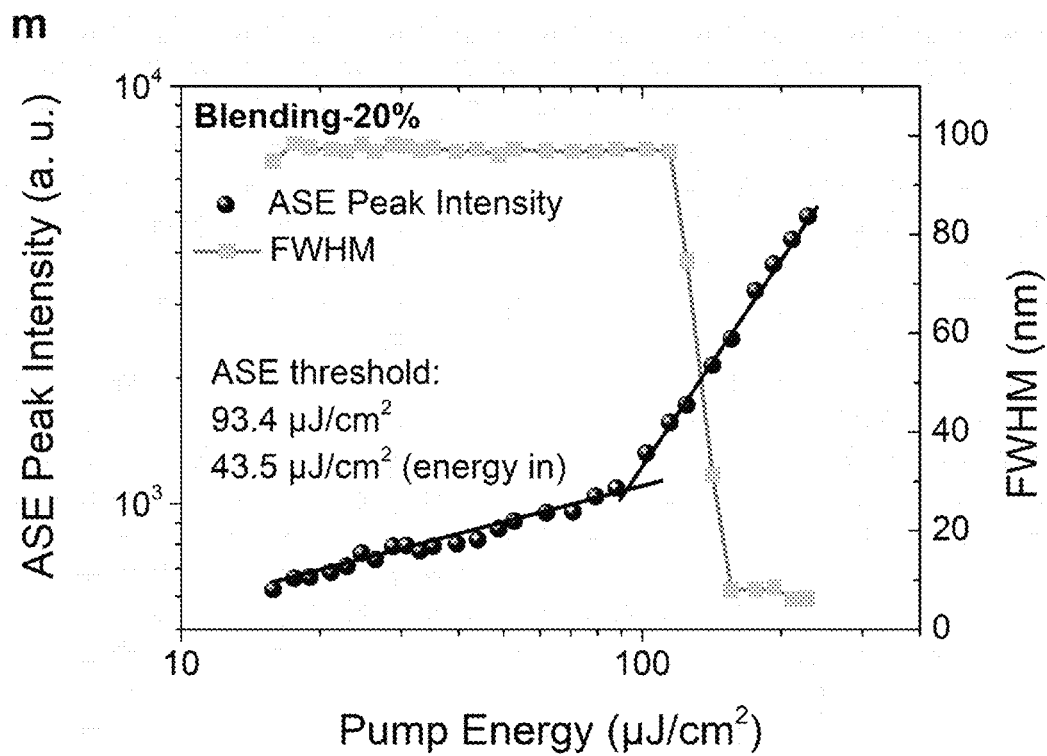
FIG. 12M shows the ASE result of the blended sample with MEH-PPV concentration of 20% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12N:
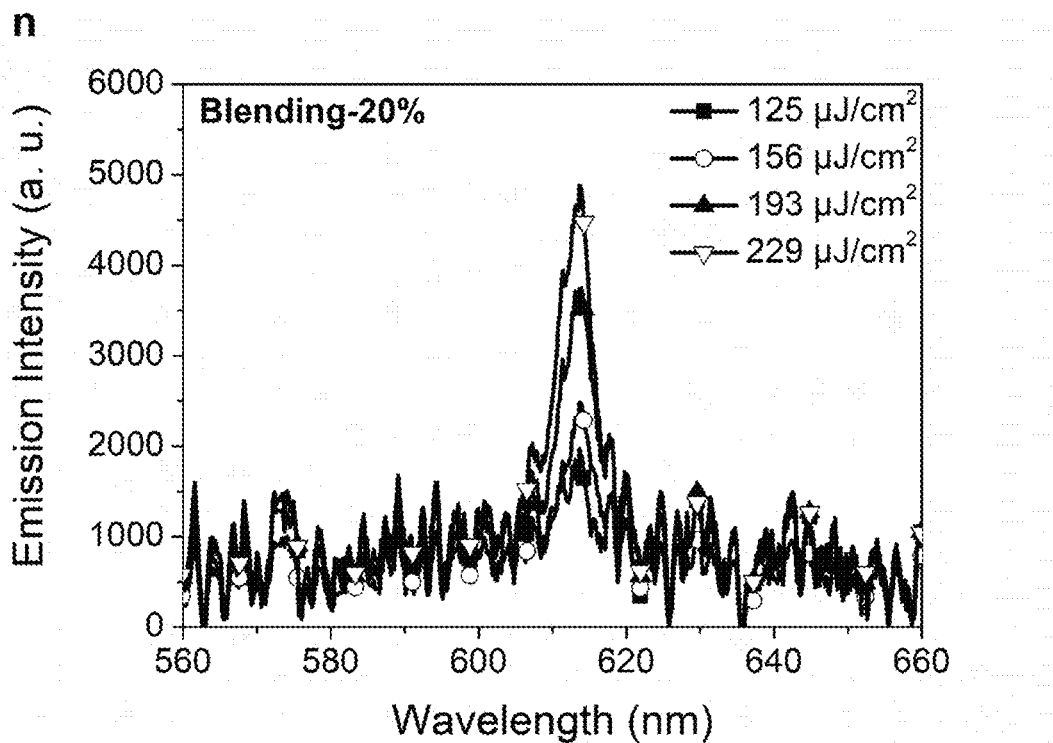
FIG. 12N shows the emission spectra for the planar waveguide of the blended sample with MEH-PPV concentration of 20%.
Figure 12O:
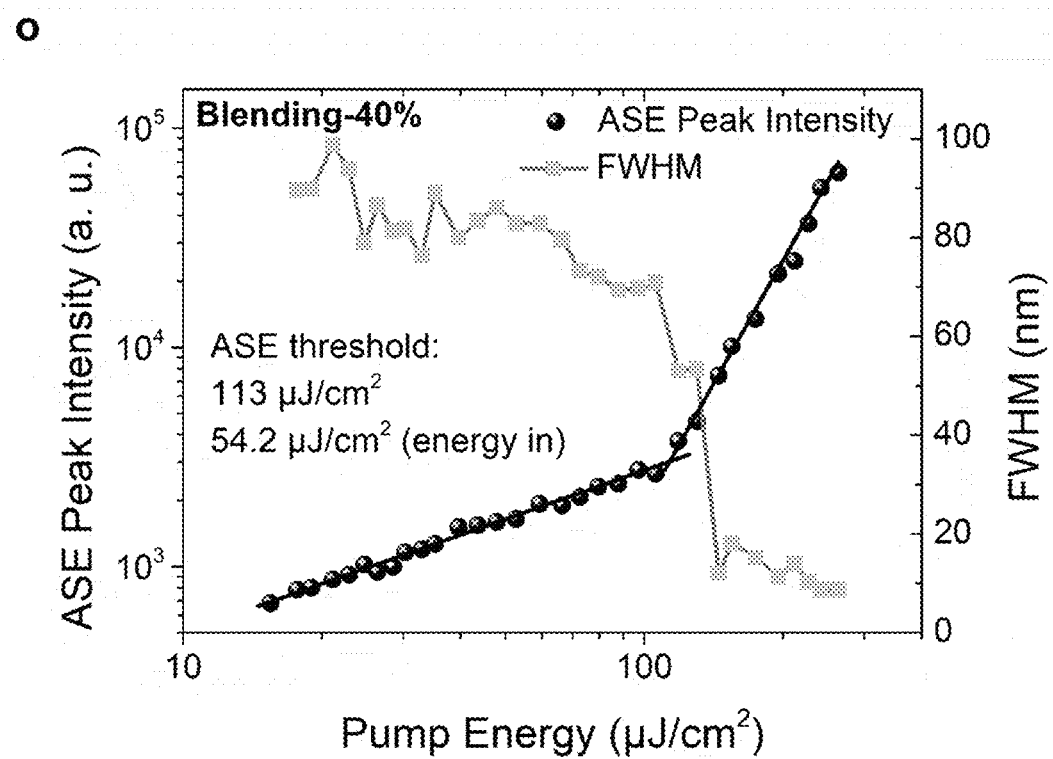
FIG. 12O shows the ASE result of the blended sample with MEH-PPV concentration of 40% for amplification wavelength around 610 nm (±10 nm). FWHM of the emission spectra (solid squares) and the corresponding output intensity (solid spheres) of the blended sample as a function of the pump energy density. The ASE threshold value and ASE threshold (energy in) value are estimated with or without taking into account of transmission loss, respectively.
Figure 12P:
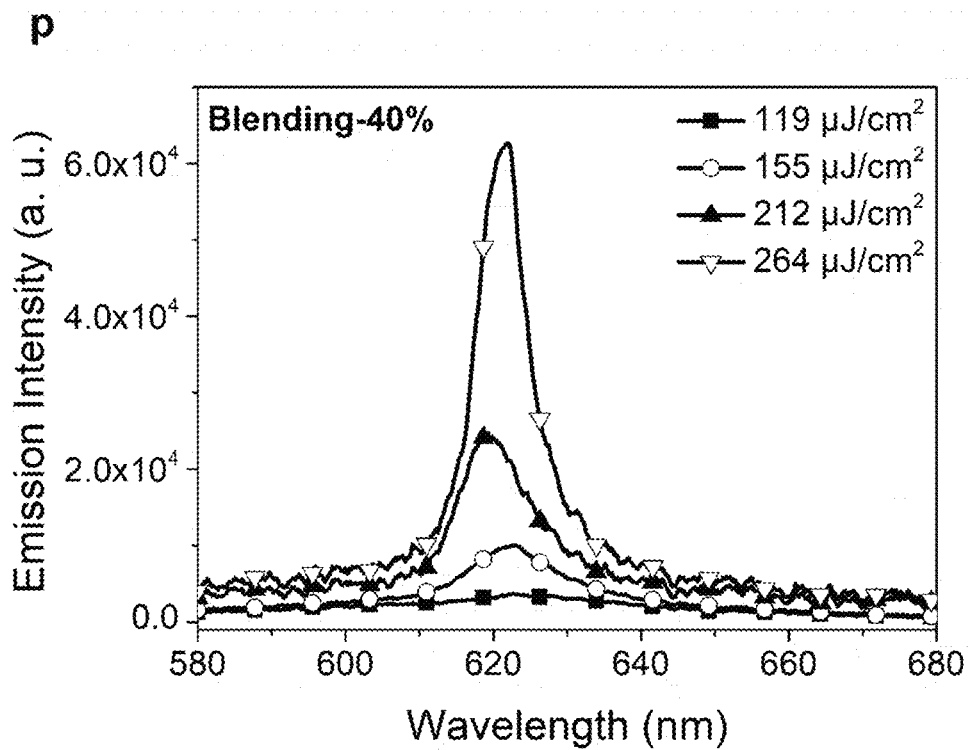
FIG. 12P shows the emission spectra for the planar waveguide of the blended sample with MEH-PPV concentration of 40%.

Through precise modulation of the blending ratio, tunable light amplification are demonstrated in the blend system. The tunable ASE wavelength results with different MEH-PPV concentrations are listed as below:

- between 0% and 0.04% for amplification wavelength around 525 nm (FIGS. 9A-9F);
- with 0.1% for dual-wavelengths amplification at 524 nm and 563 nm (FIGS. 10A-10B);
- between 0.2% and 2% for amplification wavelength around 570 nm (FIGS. 11A-11J);
- between 4% and 40% for amplification wavelength around 610 nm (±10 nm) (FIGS. 12A-12P).

Figure 13A:
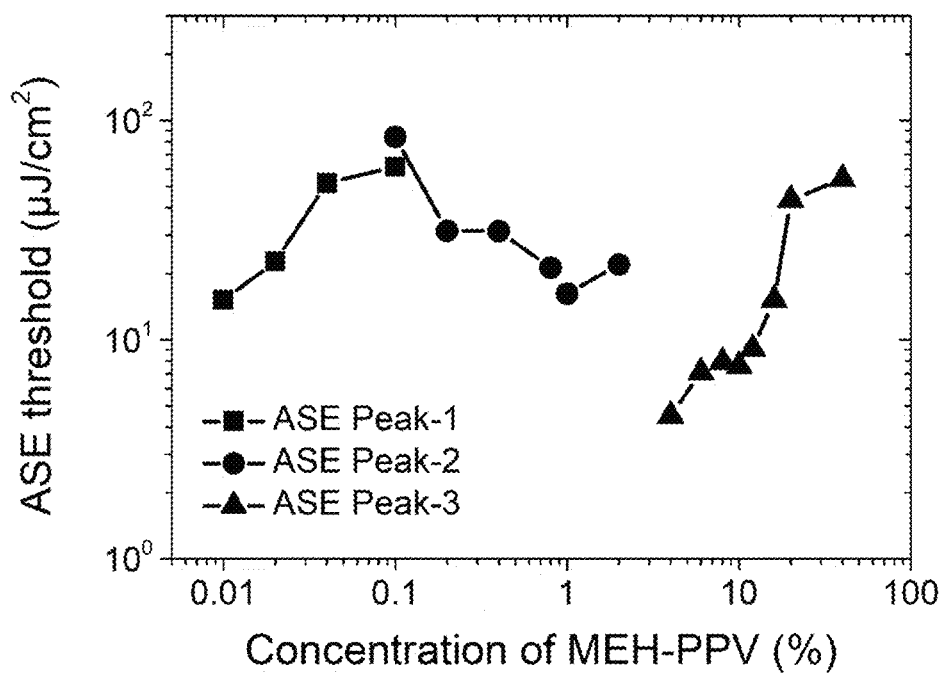
FIG. 13A shows ASE threshold (without taking transmission loss into account) energy plotted as a function of MEH-PPV fraction for blend system pumped at the $\lambda_{ex}=355$ nm. The chosen MEH-PPV fractions in the blended samples are 0.01%, 0.02%, 0.04%, 0.1%, 0.2%, 0.4%, 0.8%, 1%, 2%, 4%, 6%, 8%, 10%, 12%, 16%, 20%, and 40%, respectively.
Figure 13B:
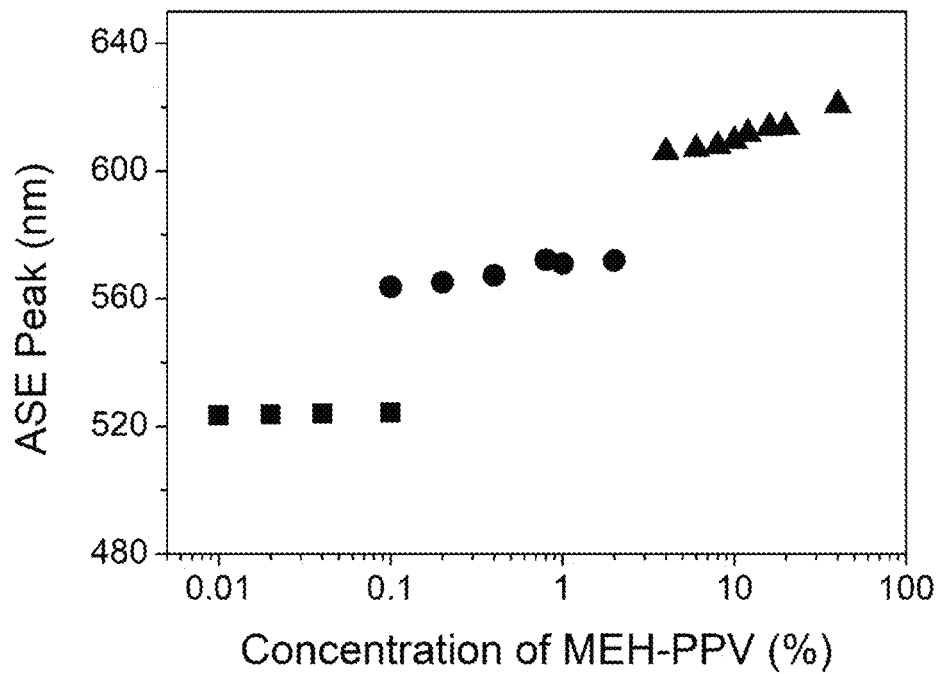
FIG. 13B shows ASE central wavelength of the blended sample versus the MEH-PPV concentration.

The ASE thresholds at different amplification wavelength bands are varied. In the blend system, the lowest green-colour ASE threshold of 15.2 μJ/cm$^2$ is demonstrated in blending-0.01%; the lowest yellow-colour ASE threshold of 16.2 μJ/cm$^2$ is demonstrated in blending-1%; the lowest red-colour ASE threshold of 4.5 μJ/cm$^2$ is demonstrated in blending-4% (FIG. 13A). The corresponding ASE peaks at different MEH-PPV concentrations are shown in FIG. 13B.

Figure 14:
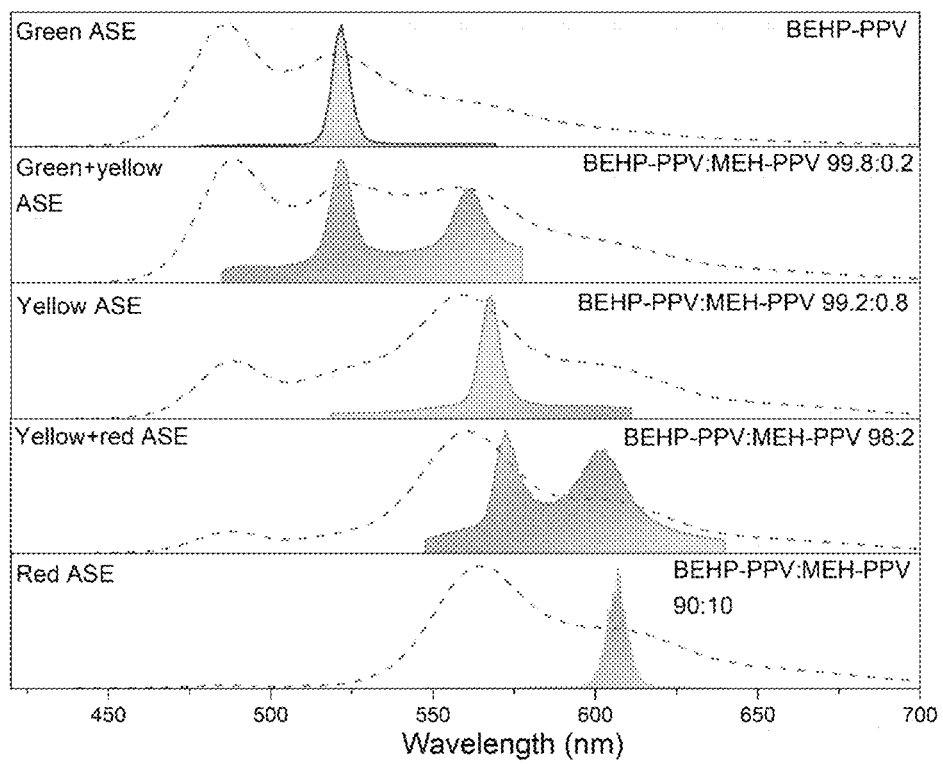
FIG. 14 shows tunable ASE spectra of BEHP-PPV:MEH-PPV blend system with emission wavelength from 520 nm to 610 nm. The results are pumped with another laser system with $\lambda_{ex}=355$ nm.
Figure 15A:
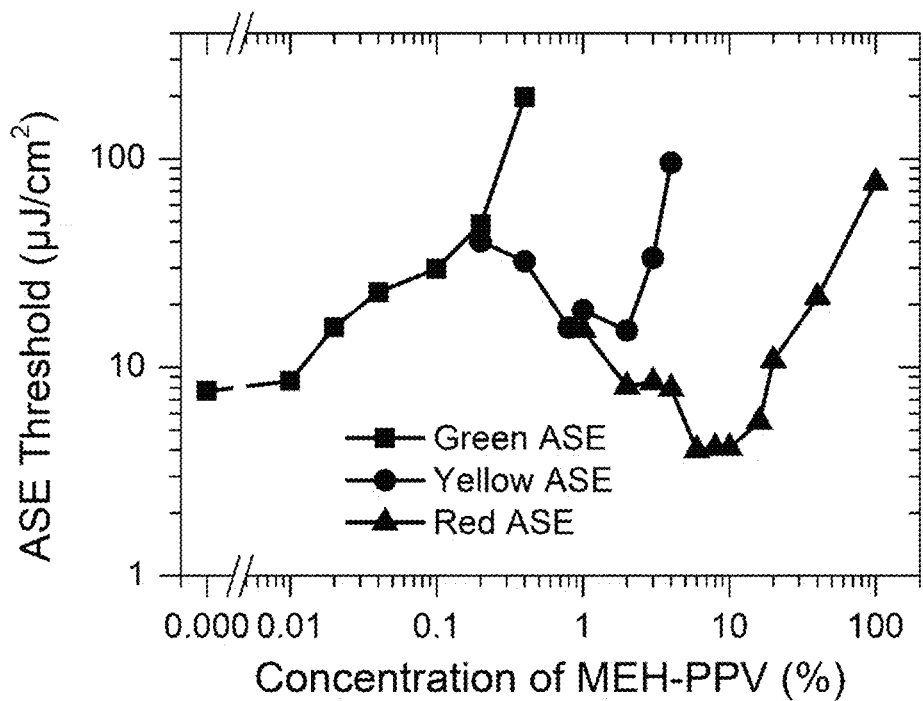
FIG. 15A shows ASE threshold (without taking transmission loss into account) energy plotted as a function of MEH-PPV fraction for blend system pumped at the $\lambda_{ex}=355$ nm. The results are pumped with another laser system.
Figure 15B:
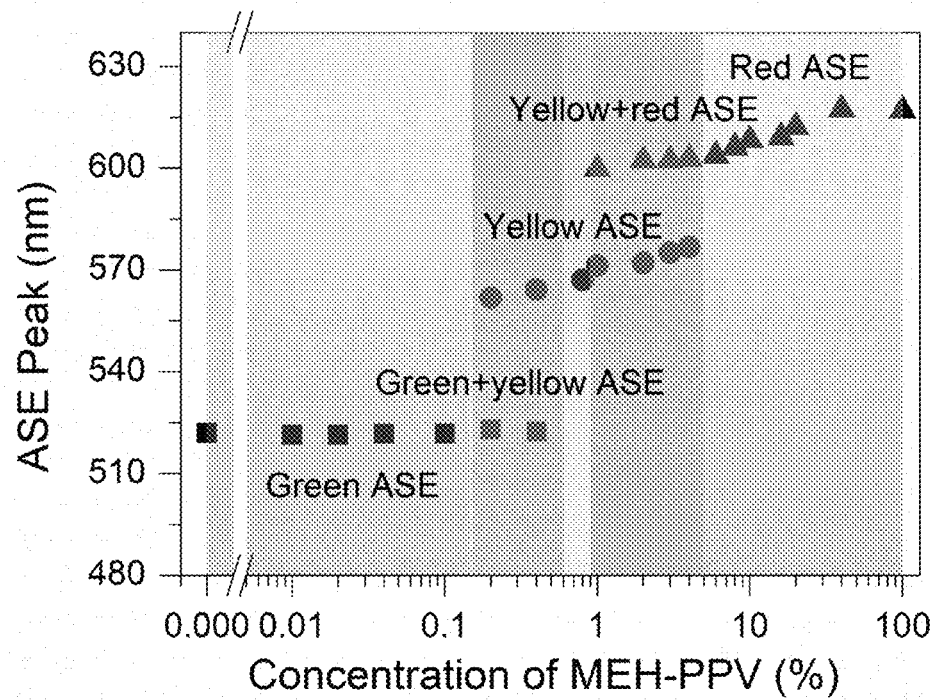
FIG. 15B shows ASE central wavelength of the blended sample versus the MEH-PPV concentration. The results are pumped with another laser system.

By using another laser device, Nd-YAG laser (5 ns, 355 nm, 10 Hz), as pumping source, the tunable amplification from green to red (green ASE, green+yellow ASE, yellow ASE, yellow+red ASE, red ASE) are also demonstrated in BEHP-PPV:MEH-PPV blend system (FIG. 14). The corresponding ASE thresholds and peaks at different MEH-PPV concentrations are shown in FIGS. 15A and 15B, respectively.

A Second Blended Polymer System, PFO:BEHP-PPV

Figure 16:
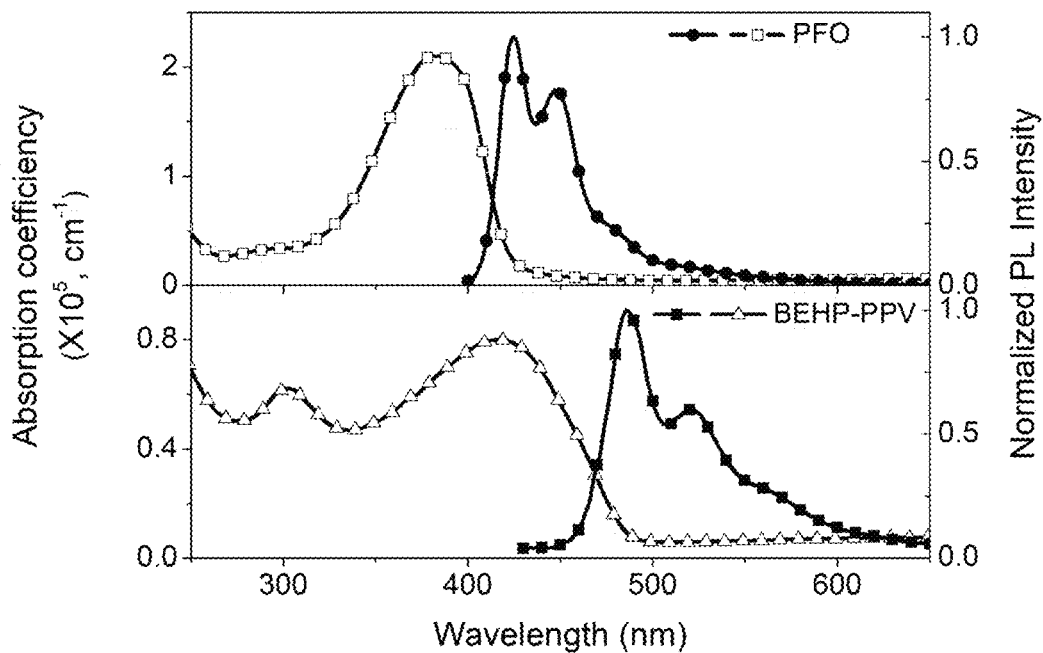
FIG. 16 shows the absorbance and PL spectra of PFO and BEHP-PPV. There is an obvious spectral overlap between the absorption spectrum of BEHP-PPV and the PL spectrum of PFO, which is expected to induce efficient energy transfer from PFO to BEHP-PPV.
Figure 17A:
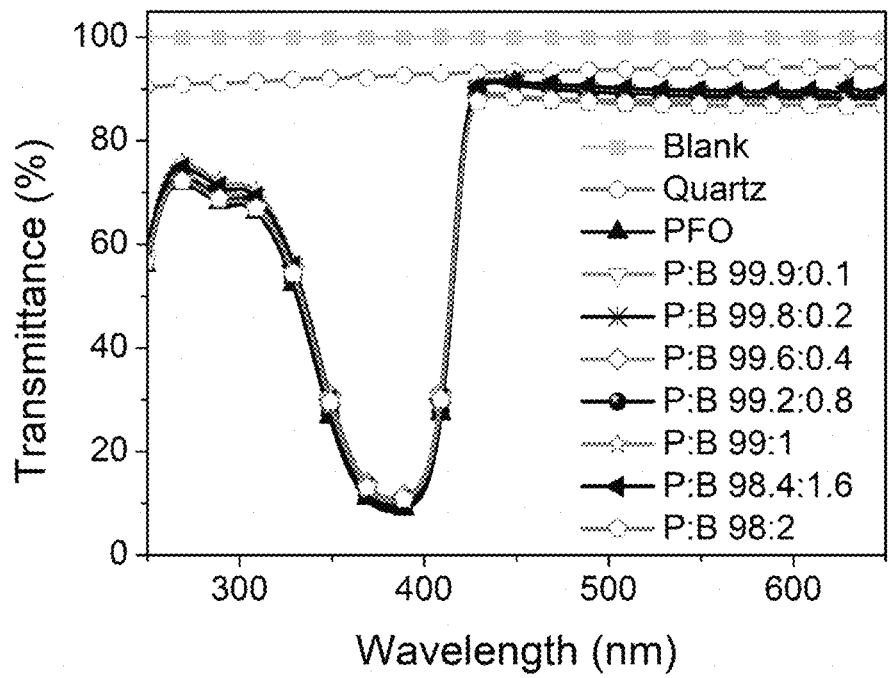
FIG. 17A shows transmittance spectra of PFO:BEHP-PPV blend system in neat films. The BEHP-PPV concentrations are tuned in the range of 0.1%-2%. The transmittance spectra of PFO neat film is also shown in the figure. The number of P:B represents the concentration ratio of PFO to BEHP-PPV.
Figure 17B:
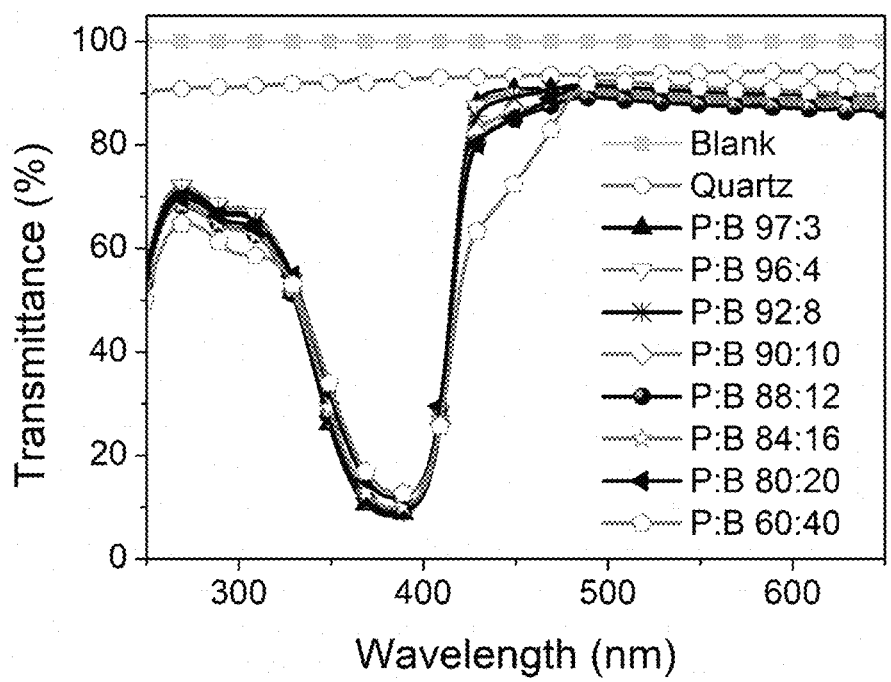
FIG. 17B shows transmittance spectra of PFO:BEHP-PPV blend system in neat films. The BEHP-PPV concentrations are tuned in the range of 3%-40%. The number of P:B represents the concentration ratio of PFO to BEHP-PPV.
Figure 17C:
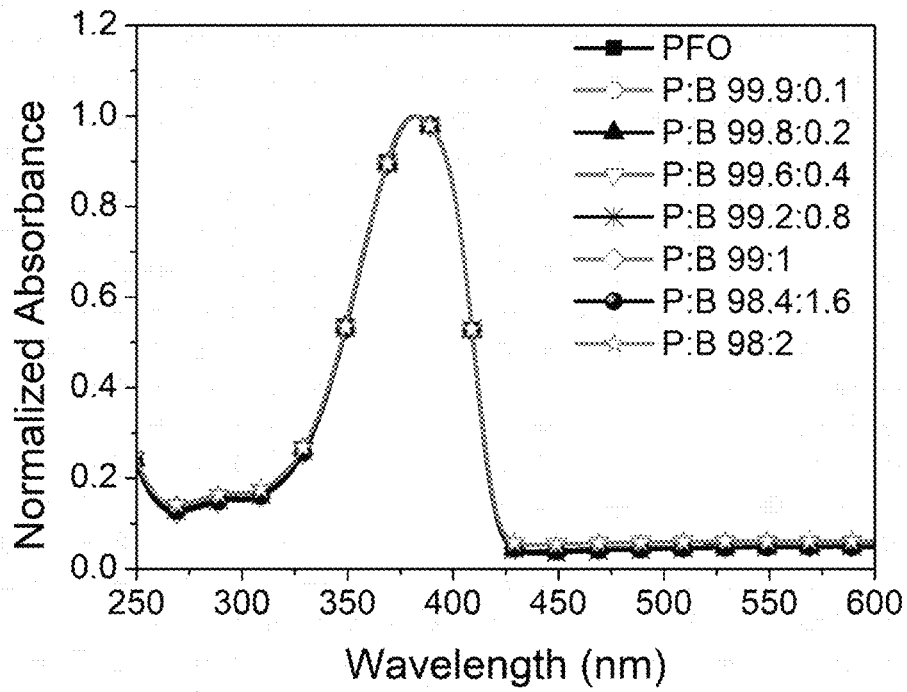
FIG. 17C shows normalized absorbance spectra of PFO:BEHP-PPV blend system in neat films. The BEHP-PPV concentrations are tuned in the range of 0.1%-2%. The normalized absorbance spectrum of PFO neat film is also shown in the figure. The number of P:B represents the concentration ratio of PFO to BEHP-PPV.
Figure 17D:
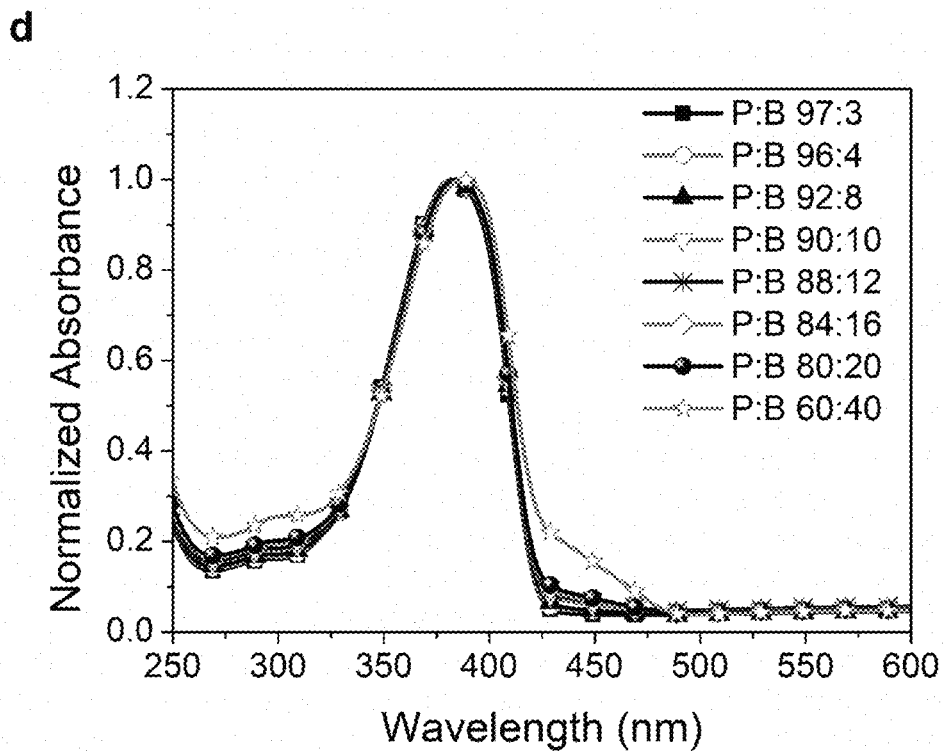
FIG. 17D shows normalized absorbance spectra of PFO:BEHP-PPV blend system in neat films. The BEHP-PPV concentrations are tuned in the range of 3%-40%. The number of P:B represents the concentration ratio of PFO to BEHP-PPV.

There is an obvious spectral overlap between the absorption spectrum of BEHP-PPV and the PL spectrum of PFO, which is expected to induce efficient energy transfer from BEHP-PPV (PFO) to MEH-PPV (BEHP-PPV) (FIG. 16).

By using the similar method (mixing the polymer solutions of PFO and BEHP-PPV), the blended solutions of PFO:BEHP-PPV are prepared. The mixed solutions are stirred with heating (50-90° C.) and a stirring speed (200-1000 rpm). The films of blended polymer were deposited by spin-coating the mixed solutions on quartz substrates. The spin-coating speed is between 500 rpm to 8000 rpm. The accelerated speed is between 500 rpm/s to 4000 rpm/s. The film thicknesses of the blended samples are ~(130±10) nm.

Figure 18A:
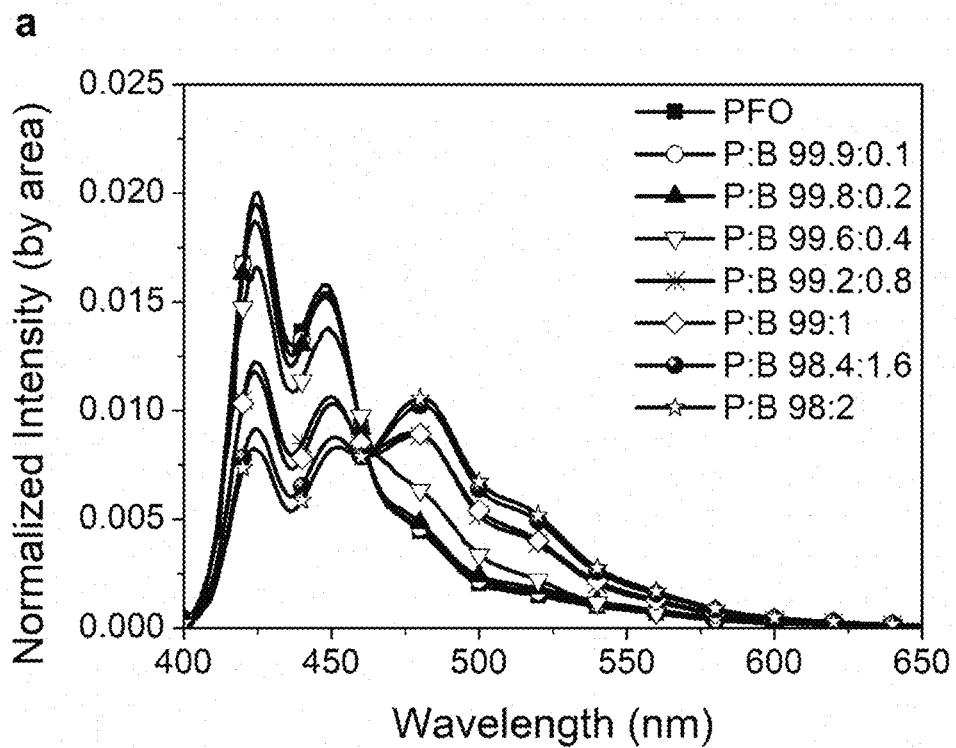
FIG. 18A shows PL spectra (normalize by area) of PFO:BEHP-PPV blended samples. The BEHP-PPV concentrations are tuned in the range of 0.1%-2%. The PL spectrum (normalize by area) of PFO neat film is also shown in the figure. The number of P:B represents the concentration ratio of PFO to BEHP-PPV.
Figure 18B:
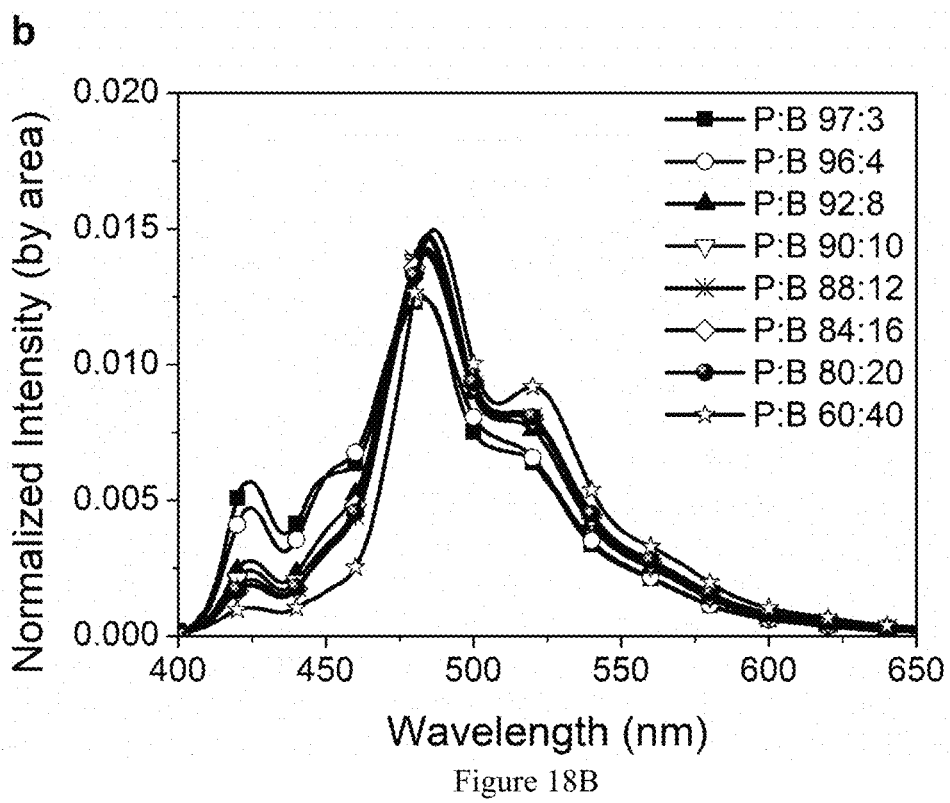
FIG. 18B shows PL spectra (normalize by area) of PFO:BEHP-PPV blended samples. The BEHP-PPV concentrations are tuned in the range of 3%-40%. The number of P:B represents the concentration ratio of PFO to BEHP-PPV.
Figure 19:
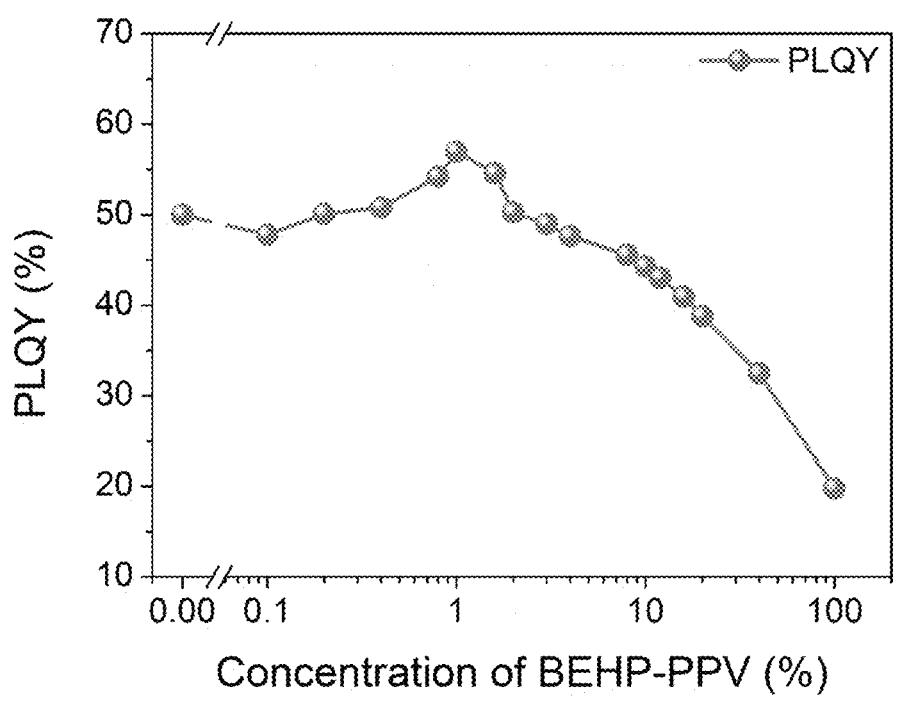
FIG. 19 shows the PLQY value of PFO:BEHP-PPV blended film as a function of BEHP-PPV concentration excited at 390 nm.

The transmission and absorbance spectra of these blended samples are involved the transmission and absorption signals of both PFO and BEHP-PPV (FIGS. 17A to 17D). The BEHP-PPV fluorescence are gradually increased with respect to the increase of BEHP-PPV ratio, representing the energy transfer in this process (FIGS. 18A and 18B). The PLQY values are within 32%-57% (FIG. 19).

Figure 20:
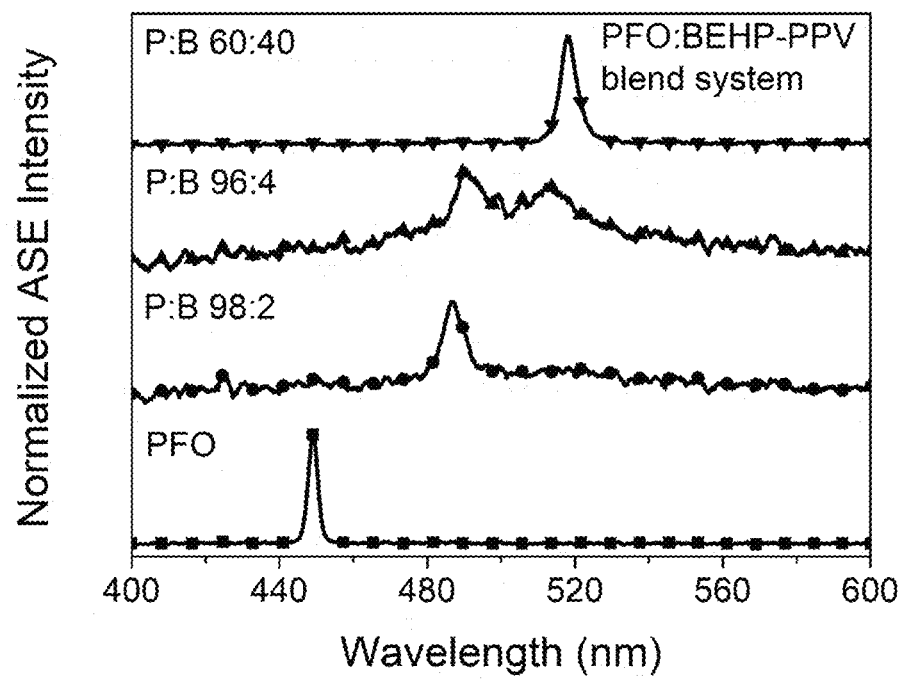
FIG. 20 shows multiple ASE spectra of the PFO:BEHP-PPV blend system with emission wavelength from 450 nm to 520 nm. The number of P:B represents the concentration ratio of PFO to BEHP-PPV.

Tunable light amplification with ASE wavelengths from 450 nm to 520 nm are demonstrated in PFO:BEHP-PPV blend system (FIG. 20).

Tunable DFB Lasers from the Blend Systems

Figure 21:
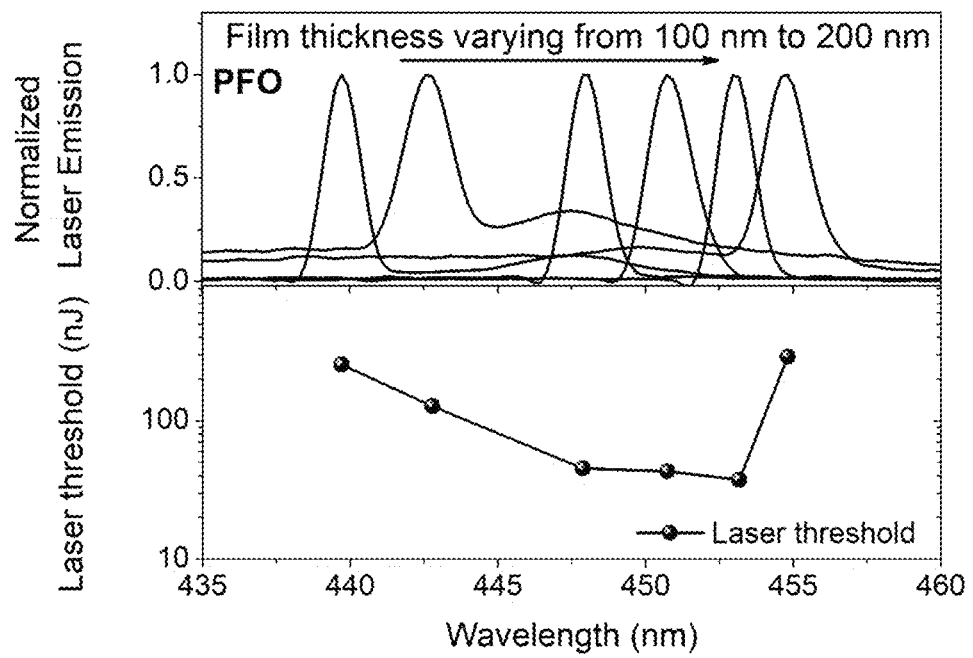
FIG. 21 shows the tunable blue lasing wavelength through variations in PFO polymer film thickness (film thicknesses varying from 100 nm to 200 nm; same distributed feedback (DFB) grating with period of 270 nm) in the top panel, and the corresponding wavelength variation of the pump laser threshold energy density for the PFO DFB lasers in the bottom panel.
Figure 25:
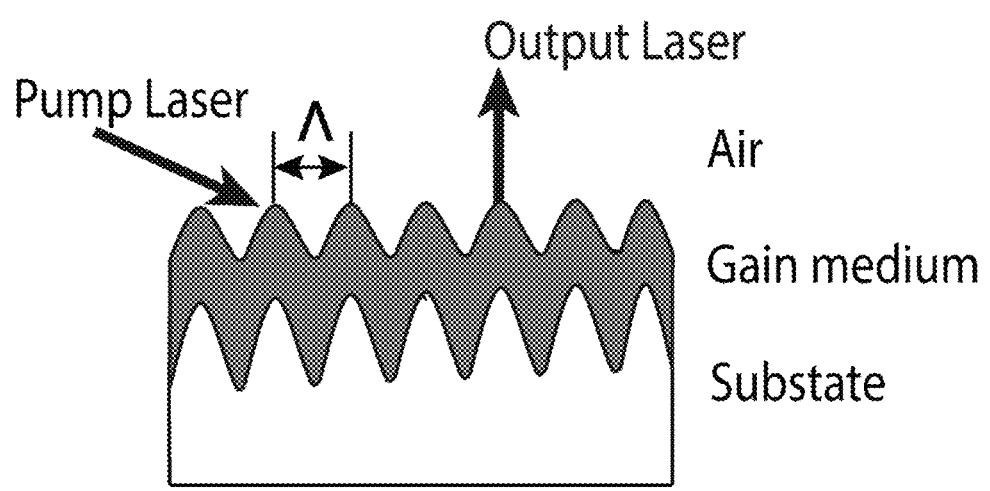
FIG. 25 is a schematic drawing of a DFB feedback structure.

By integrating DFB feedback structure with grating period of 270 nm, the PFO DFB laser devices show tunable blue lasing output with wavelength variations between 439 nm to 456 nm (FIG. 21). The lowest lasing threshold is ca. 38 nJ/pulse. FIG. 25 schematically depicts the DFB feedback structure.

Figure 22:
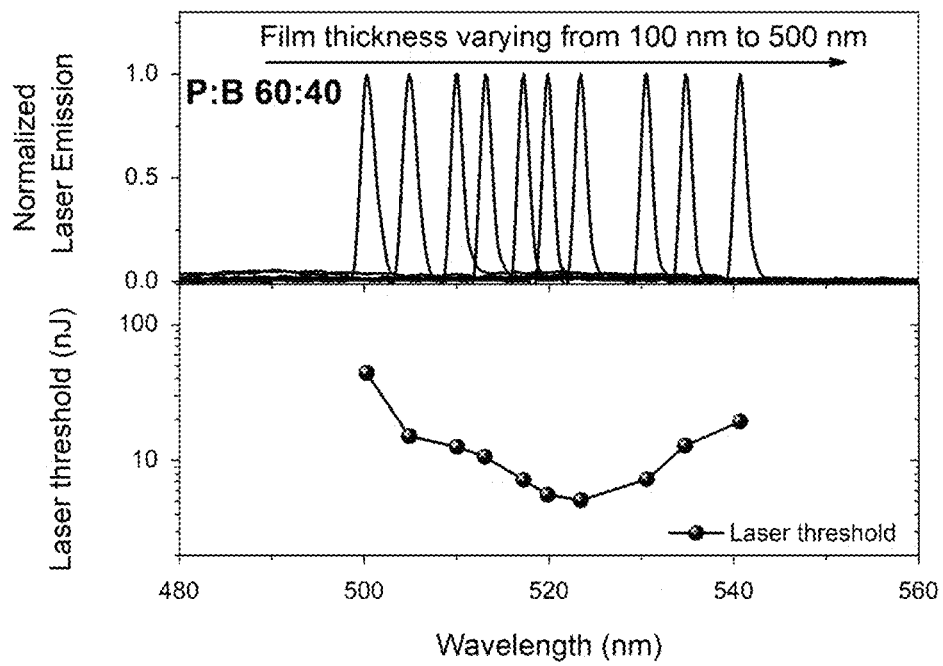
FIG. 22 shows the tunable green lasing wavelength through variations in PFO:BEHP-PPV 60:40 polymer film thickness (film thicknesses varying from 100 nm to 500 nm; same DFB grating with period of 340 nm) in the top panel, and the corresponding wavelength variation of the pump laser threshold energy density for the blend PFO:BEHP-PPV (60:40) DFB lasers in the bottom panel. The number of P:B represents the concentration ratio of PFO to BEHP-PPV.

By integrating DFB feedback structure with grating period of 340 nm, the PFO:BEHP-PPV 60:40 DFB laser devices show tunable green lasing output with wavelength variations between 500 nm to 541 nm (FIG. 22). The lowest lasing threshold is ca. 5 nJ/pulse.

Figure 23:
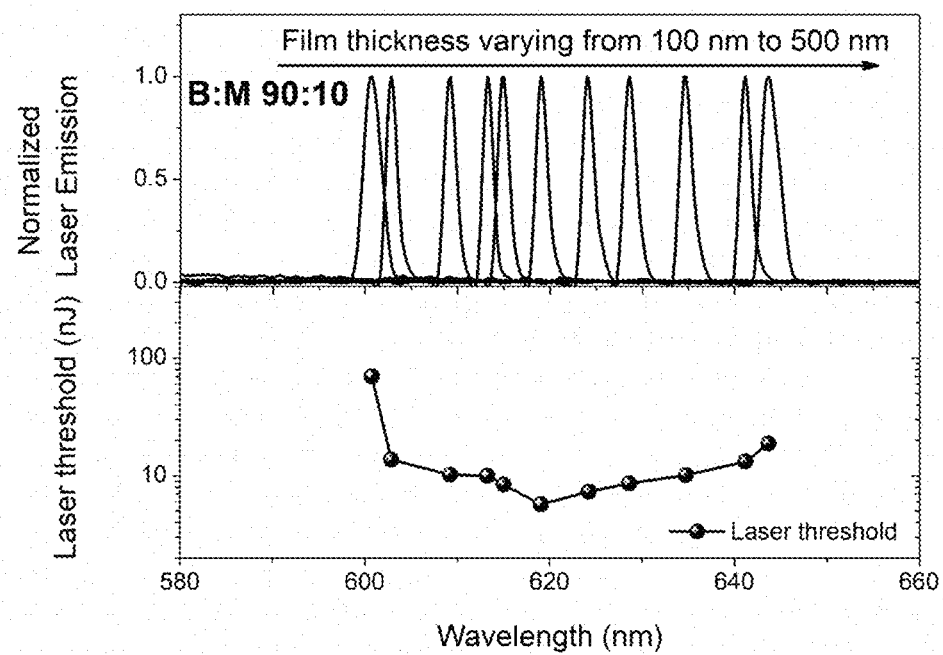
FIG. 23 shows the tunable red lasing wavelength through variations in BEHP-PPV:MEH-PPV 90:10 polymer film thickness (film thicknesses varying from 100 nm to 500 nm; same DFB grating with period of 415 nm) in the top panel, and the corresponding wavelength variation of the pump laser threshold energy density for the blend BEHP-PPV:MEH-PPV (90:10) DFB lasers in the bottom panel. The number of B:M represents the concentration ratio of BEHP-PPV to MEH-PPV.
Figure 24:
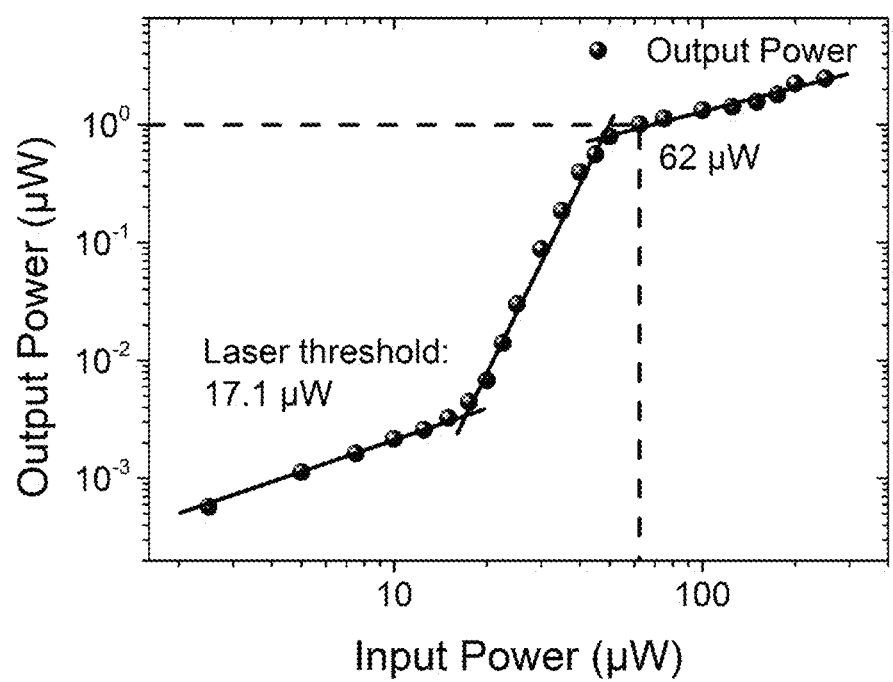
FIG. 24 shows output power versus input power for the blend BEHP-PPV:MEH-PPV (90:10) DFB lasers with laser output at 619 nm.

By integrating DFB feedback structure with grating period of 415 nm, the BEHP-PPV:MEH-PPV DFB laser devices show tunable red lasing output with wavelength variations between 600 nm to 644 nm (FIG. 23). The lowest lasing threshold is ca. 6 nJ/pulse. As an example, the DFB lasing output with large area grating (1.2 mm×1.2 mm) is demonstrated in BEHP-PPV:MEH-PPV (90:10) blended sample emitting at 619 nm. When the pump power is 62 µW, the output power is greater than 1 µW. The laser output slope efficiency is <1.6% (FIG. 24).

INDUSTRIAL APPLICATION

The present invention relates to a blended polymer system that has the property of tunable lasing wavelength through adjusting the blending ratio. It can be used for health monitoring, environmental monitoring sensor and tissue imaging. In these applications it is very often that a broad range of emission light is needed for detection of gases, contaminants and bio-tissues. Current materials do not have the broad tunable range; from blue to infra-red across the optical range. By using the same two polymers, it is possible to produce laser emitting blue to red colour. It simplifies the design, eases multi-wavelength laser sensor system integration and therefore, making the production cost-effective.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

The invention claimed is:

1. A solid-state blended polymer lasing system with a lasing wavelength that is determined by a selected blending ratio of polymer compounds in said polymer lasing system, wherein the blended polymer lasing system comprises a blend of at least two polymer compounds comprising poly (9,9-dioctylfluorene) and poly(2-(2',5'-bis(2"-ethylhexyloxy)phenyl)-1,4-phenylenevinylene).

2. The solid-state blended polymer lasing system according to claim 1, wherein the blending ratio of the at least two polymer compounds of said blended polymer lasing system is equal to or higher than 0.01:99.99, and wherein a majority of the blend of the at least two polymer compounds is poly(2-(2',5'-bis(2"-ethylhexyloxy)phenyl)-1,4-phenylenevinylene).

3. The solid-state blended polymer lasing system according to claim 1, wherein the blending ratio of the at least two polymer compounds of said blended polymer lasing system is equal to or lower than 40:60, and wherein a majority of the blend of the at least two polymer compounds is poly(2-(2',5'-bis(2"-ethylhexyloxy)phenyl)-1,4-phenylenevinylene).

4. The solid-state blended polymer lasing system according to claim 1, wherein a blending ratio of the at least two polymer compounds of said blended polymer lasing system is equal to or higher than 0.1:99.9, and wherein a majority of the blend of the at least two polymer compounds is poly(9,9-dioctylfluorene).

5. The solid-state blended polymer lasing system according to claim 1, wherein a blending ratio of the at least two polymer compounds of said blended polymer lasing system is equal to or lower than 40:60, and wherein a majority of the blend of the at least two polymer compounds is poly(9,9-dioctylfluorene).

6. The solid-state blended polymer lasing system according to claim 1, wherein a blending ratio of the at least two polymer compounds of said blended polymer lasing system is equal to or lower than 40:60, and wherein the minority of the blend of the at least two polymer compounds is poly(2-(2',5'-bis(2"-ethylhexyloxy)phenyl)-1,4-phenylenevinylene).

7. The solid-state blended polymer lasing system according to claim 1, further comprising a DFB feedback structure with a grating period being integrated therein to provide a lasing output.

8. The solid-state blended polymer lasing system according to claim 7, wherein the grating period is 270 nm and the corresponding lasing output has a wavelength between 439 nm to 456 nm.

9. The solid-state blended polymer lasing system according to claim 7, wherein the grating period is 340 nm and the corresponding lasing output has a wavelength between 500 nm to 541 nm.

10. The solid-state blended polymer lasing system according to claim 1, wherein the blended polymer lasing system forms one or more blended polymer films with a film thickness ranging from 120 nm to 195 nm.

11. The solid-state blended polymer lasing system according to claim 10, wherein the one or more films of blended polymer is/are deposited by spin-coating a solution mixture of the at least two polymer compounds on quartz substrates.

12. A solid-state blended polymer lasing system with a lasing wavelength that is determined by a selected blending ratio of polymer compounds in the polymer lasing system, wherein the blended polymer lasing system comprises a blend of at least two polymer compounds comprising poly (2-(2',5'-bis(2"-ethylhexyloxy)phenyl)-1,4-phenylenevinylene) and poly(2-methoxy-5-(2-ethylhexyloxy)-1,4-phenylenevinylene) and further comprising a DFB feedback structure with a grating integrated therein to provide a lasing output.

13. The solid-state blended polymer lasing system according to claim 12, wherein a blending ratio of the at least two polymer compounds of the blended polymer lasing system is equal to or lower than 40:60, and wherein a minority of the blend is poly(2-(2',5'-bis(2"-ethylhexyloxy)phenyl)-1,4-phenylenevinylene).

14. The solid-state blended polymer lasing system according to claim 12, wherein a blending ratio of the at least two polymer compounds of the blended polymer lasing system is equal to or lower than 40:60, and wherein a majority of the blend is poly(2-(2',5'-bis(2"-ethylhexyloxy)phenyl)-1,4-phenylenevinylene).

15. The solid-state blended polymer lasing system according to claim 12, wherein the grating period is 415 nm and the corresponding lasing output has a wavelength between 600 nm to 644 nm.

* * * * *